US012059632B2

(12) United States Patent
Lamm

(10) Patent No.: US 12,059,632 B2
(45) Date of Patent: Aug. 13, 2024

(54) AUGMENTED REALITY SYSTEM FOR ENHANCING THE EXPERIENCE OF PLAYING WITH TOYS

(71) Applicant: Nickolay Lamm, Pittsburgh, PA (US)

(72) Inventor: Nickolay Lamm, Pittsburgh, PA (US)

( * ) Notice: Subject to any disclaimer, the term of this patent is extended or adjusted under 35 U.S.C. 154(b) by 346 days.

(21) Appl. No.: 16/950,740

(22) Filed: Nov. 17, 2020

(65) Prior Publication Data
US 2021/0146265 A1 May 20, 2021

Related U.S. Application Data

(60) Provisional application No. 62/936,530, filed on Nov. 17, 2019.

(51) Int. Cl.
*G06F 3/0482* (2013.01)
*A63H 3/36* (2006.01)
(Continued)

(52) U.S. Cl.
CPC ............... *A63H 3/36* (2013.01); *G06F 3/011* (2013.01); *G06F 3/0304* (2013.01);
(Continued)

(58) Field of Classification Search
CPC ........ A63H 3/36; A63H 3/00; A63H 2200/00; G06V 40/20; G06V 40/28; G06V 20/20;
(Continued)

(56) References Cited

U.S. PATENT DOCUMENTS 9,224,231 B2 12/2015 Peddi
9,545,563 B2 1/2017 Yim et al.
(Continued)

FOREIGN PATENT DOCUMENTS

CN 101620666 A * 1/2010 ......... G06K 7/10722
KR 2010118943 A * 11/2010

OTHER PUBLICATIONS

Shapira et al., "TactileVR: Integrating Physical Toys into Learn and Play Virtual Reality Experiences", 2016 IEEE International Symposium on Mixed and Augmented Reality (ISMAR), pp. 100-106, published on Sep. 1, 2016. (Year: 2016).*
(Continued)

*Primary Examiner* — Reza Nabi
*Assistant Examiner* — Hwei-Min Lu
(74) *Attorney, Agent, or Firm* — LOZA & LOZA LLP; Kevin Lee Soules

(57) ABSTRACT

The systems and methods disclosed herein relate to play enhanced with augmented reality, the disclosed systems comprising: a user device, the user device comprising, a camera, and a computer system, the computer system further comprising: at least one processor; a graphical user interface and a computer-usable medium embodying computer program code configured for: collecting at least one frame of video with an image capture module; identifying user controlled objects in the at least one frame of video with an object recognition module, and rendering an augmented reality display on the user device with an augmented reality module, the augmented reality display including an augmented background and a rendering of the at least one user controlled object.

20 Claims, 18 Drawing Sheets

(51) Int. Cl.
  *G06F 3/01* (2006.01)
  *G06F 3/03* (2006.01)
  *G06T 11/00* (2006.01)
  *G06V 20/20* (2022.01)
  *G06V 20/40* (2022.01)
  *G06V 40/20* (2022.01)
  *A63F 13/213* (2014.01)
  *A63F 13/2145* (2014.01)

(52) U.S. Cl.
  CPC ............ *G06F 3/0482* (2013.01); *G06T 11/00* (2013.01); *G06V 20/20* (2022.01); *G06V 20/40* (2022.01); *G06V 40/28* (2022.01); *A63F 13/213* (2014.09); *A63F 13/2145* (2014.09); *A63H 2200/00* (2013.01); *G06F 3/017* (2013.01); *G06T 2200/24* (2013.01)

(58) Field of Classification Search
  CPC ....... G06V 20/40; G06F 3/011; G06F 3/0482; G06T 11/00; G06T 2200/24; A63F 13/213; A63F 13/2145
  USPC ................. 345/633; 446/82, 83, 97
  See application file for complete search history.

(56) References Cited

U.S. PATENT DOCUMENTS

| | | | |
|---|---|---|---|
| 9,555,337 | B2 | 1/2017 | Garlington et al. |
| 9,586,135 | B1* | 3/2017 | Capper .................. A63F 13/42 |
| 10,217,289 | B2 | 2/2019 | Mitchell et al. |
| 2014/0002677 | A1* | 1/2014 | Schinker ................ H04N 5/272 |
| | | | 348/207.1 |
| 2014/0267404 | A1* | 9/2014 | Mitchell ................ G06T 19/006 |
| | | | 345/633 |
| 2014/0306995 | A1* | 10/2014 | Raheman ................ A63F 13/42 |
| | | | 345/633 |
| 2015/0279101 | A1* | 10/2015 | Anderson ................ G09G 5/377 |
| | | | 345/633 |
| 2015/0287403 | A1* | 10/2015 | Holzer Zaslansky ....................... |
| | | | G06T 13/205 |
| | | | 704/231 |
| 2015/0310041 | A1* | 10/2015 | Kier ...................... A63F 13/213 |
| | | | 463/33 |
| 2016/0027219 | A1 | 1/2016 | Nuzzi |
| 2016/0091964 | A1* | 3/2016 | Iyer ........................ G06V 20/20 |
| | | | 715/863 |
| 2016/0180590 | A1* | 6/2016 | Kamhi .................. G06T 19/006 |
| | | | 345/633 |
| 2017/0098332 | A1* | 4/2017 | Knight .................... H04N 23/90 |
| 2018/0184140 | A1* | 6/2018 | Danker ............... H04N 21/4758 |
| 2018/0188831 | A1* | 7/2018 | Lyons ...................... G06F 3/016 |
| 2018/0264365 | A1* | 9/2018 | Soederberg ............... A63F 13/65 |
| 2019/0114836 | A1* | 4/2019 | Holzer ...................... G06T 7/75 |
| 2019/0180454 | A1* | 6/2019 | Choudhury ........... H04N 19/139 |
| 2019/0310758 | A1* | 10/2019 | Agarawala ............ G06T 19/006 |
| 2020/0330873 | A1 | 10/2020 | Keefe et al. |
| 2022/0266159 | A1* | 8/2022 | Walker ................... A63F 13/65 |

OTHER PUBLICATIONS

Zing Klikbot Zanimation Studio. Stop Motion Action Figure Set. (downloaded Nov. 17, 2020). https://www.amazon.com.

* cited by examiner

AUGMENTED REALITY SYSTEM FOR ENHANCING THE EXPERIENCE OF PLAYING WITH TOYS

CROSS REFERENCE TO RELATED PATENT APPLICATIONS

This patent application claims the priority and benefit, under 35 U.S.C. § 119(e), of U.S. Provisional Patent Application Ser. No. 62/936,530, filed Nov. 17, 2019, entitled "AUGMENTED REALITY SYSTEM FOR ENHANCING THE EXPERIENCE OF PLAYING WITH TOYS." U.S. Provisional Patent Application Ser. No. 62/936,530 is herein incorporated by reference in its entirety.

TECHNICAL FIELD

Embodiments are generally related to the field of toys. Embodiments are also related to the field of virtual and/or augmented reality. Embodiments are further related to the field of computer devices and mobile devices used for augmented and virtual reality. Embodiments are also related to methods, systems, and devices for integrating real world objects with computer generated virtual or augmented reality to enhance the experience of playing with toys.

BACKGROUND

Rapid advances in the technology underlying augmented reality and virtual reality are changing the way many people experience the world. At present, most virtual reality experiences are immersive, meaning the user is immersed in a virtual world constructed as a virtual reality.

While this kind of experience is pleasing, it is also currently limited by various technical limitations. For example, many virtual reality systems lack a convenient way to allow the user to interact with the virtual world because it is difficult to mimic the sense of touch a user experiences in the real world. Augment reality applications offer some trade-off between the immersive experience of virtual reality and the sensory experience of the real world.

Children are an interesting subset of potential virtual reality users. Specifically, as children interact with toys in the real world, they develop important motor skills, and an understanding of how their senses can be used in concert. There is no substitute for the real world experience of play. However, technology is offering new and unique opportunities to allow a child to experience scenarios that are only possible in their imagination.

Accordingly, there is a need in the art for methods and systems that provide a user the ability to interact with real world objects in an augmented reality while still experiencing the benefits of engaging in real world play.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide improved methods and systems for playing.

It is another aspect of the disclosed embodiments to provide a method, system, and apparatus for playing with toys in a mixed or augmented reality.

It is another aspect of the disclosed embodiments to provide methods, systems, and apparatuses for fostering curiosity and play with a kit that allows a child to play with physical toys in an augmented or virtual reality.

For example, in certain embodiments, a system and associated method comprises a user device, the user device comprising, a camera, and a computer system, the computer system further comprising: at least one processor, a graphical user interface, and a computer-usable medium embodying computer program code, the computer-usable medium capable of communicating with the at least one processor, the computer program code comprising instructions executable by the at least one processor and configured for: collecting at least one frame of video with an image capture module; identifying at least one user controlled object in the at least one frame of video with an object recognition module; and rendering an augmented reality display on the user device with an augmented reality module, the augmented reality display including an augmented background and a rendering of the at least one user controlled object. In an embodiment, the at least one user controlled object comprises a toy.

In an embodiment, the at least one user controlled object comprises a plurality of user controlled objects, the plurality of user controlled objects further comprising a doll and a first block. In an embodiment, the system further comprises an ID suit configured to fit on the doll, the ID suit further comprising at least one ID suit dot. In an embodiment, the block comprises a cube and at least one ID dot configured on the cube.

In an embodiment, the system further comprises an augmented object library configured to store a plurality of selectable augmented objects, wherein an augmented object is selected from the plurality of selectable augmented objects. In an embodiment, the system further comprises rendering the augmented object in the augmented reality display at a location of the first block.

In an embodiment, the system further comprises an augmented background library configured to store a plurality of selectable augmented backgrounds, wherein the augmented background is selected from the plurality of selectable augmented backgrounds.

In an embodiment, the system further comprises an augmented effects library configured to store a plurality of selectable augmented effects, wherein an augmented effect is selected from the plurality of selectable augmented effects. In an embodiment, the system further comprises rendering the augmented effect in the augmented reality display. In an embodiment, the system further comprises identifying a user gesture in the at least one frame of video with a gesture recognition module and rendering an augmented effect in the augmented reality display associated with the user gesture.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
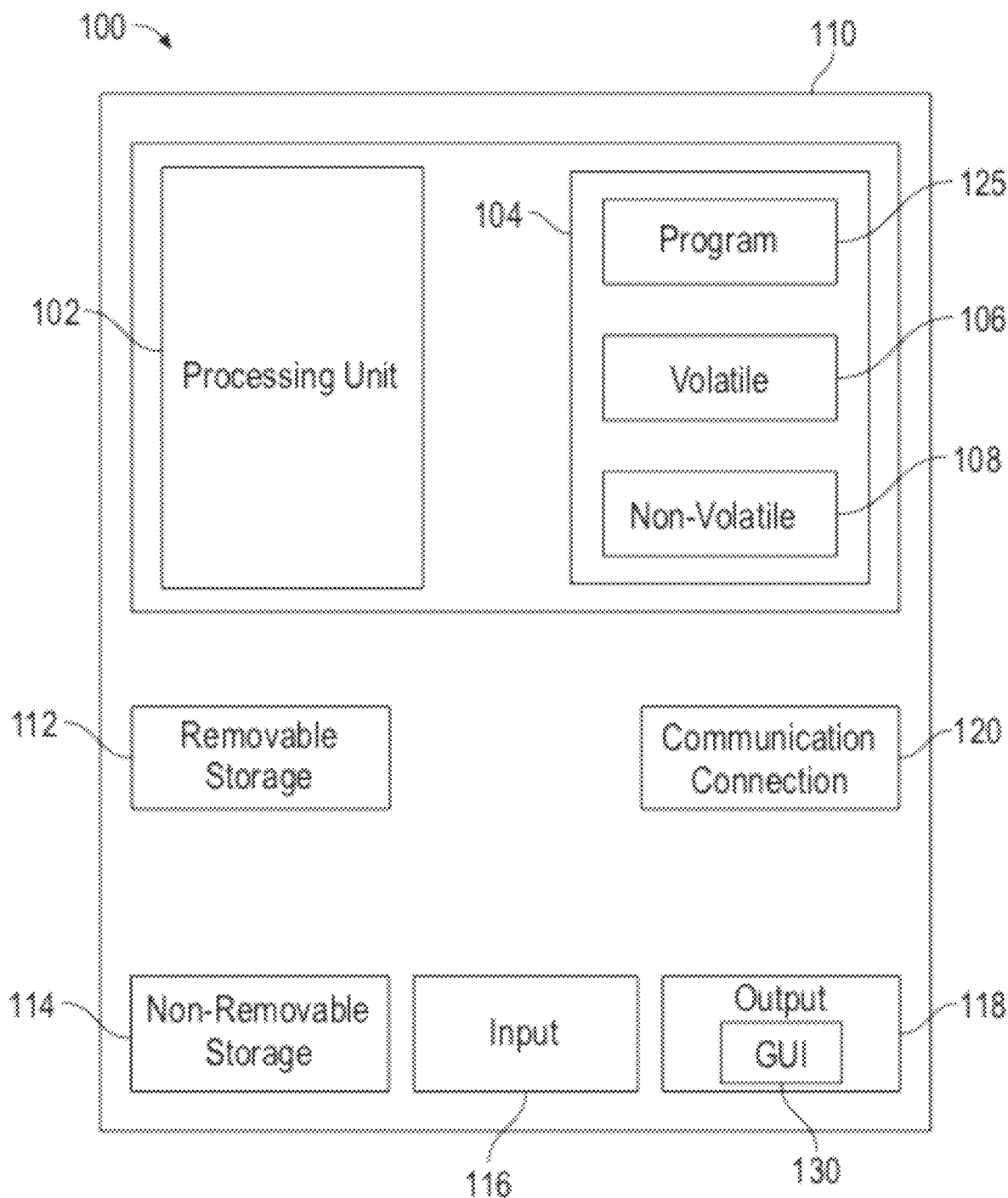
FIG. 1 depicts a block diagram of a computer system which is implemented in accordance with the disclosed embodiments.

The particularities of the following descriptions are meant to be exemplary, and are provided to illustrate one or more embodiments and are not intended to limit the scope thereof.

Such exemplary embodiments are more fully described hereinafter, including reference to the accompanying drawings, which show illustrative embodiments. The systems and methods disclosed herein can be embodied in various ways and should not be construed as limited to the embodiments set forth herein. Specifications are provided so that this disclosure will be thorough and complete, and will fully convey the scope of the embodiments to those skilled in the art. Like reference numeral may refer to like elements throughout.

The terminology used herein is for the purpose of describing particular embodiments only and is not intended to be limiting. As used herein, the singular forms such as "a", "an", and "the" are intended to include plural forms as well, unless context clearly indicates otherwise. Likewise, the terms "comprise," "comprises" and/or "comprising," as used herein, specify the presence of stated features, integers, steps, operations, elements, and/or components, but do not preclude the presence or addition of other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
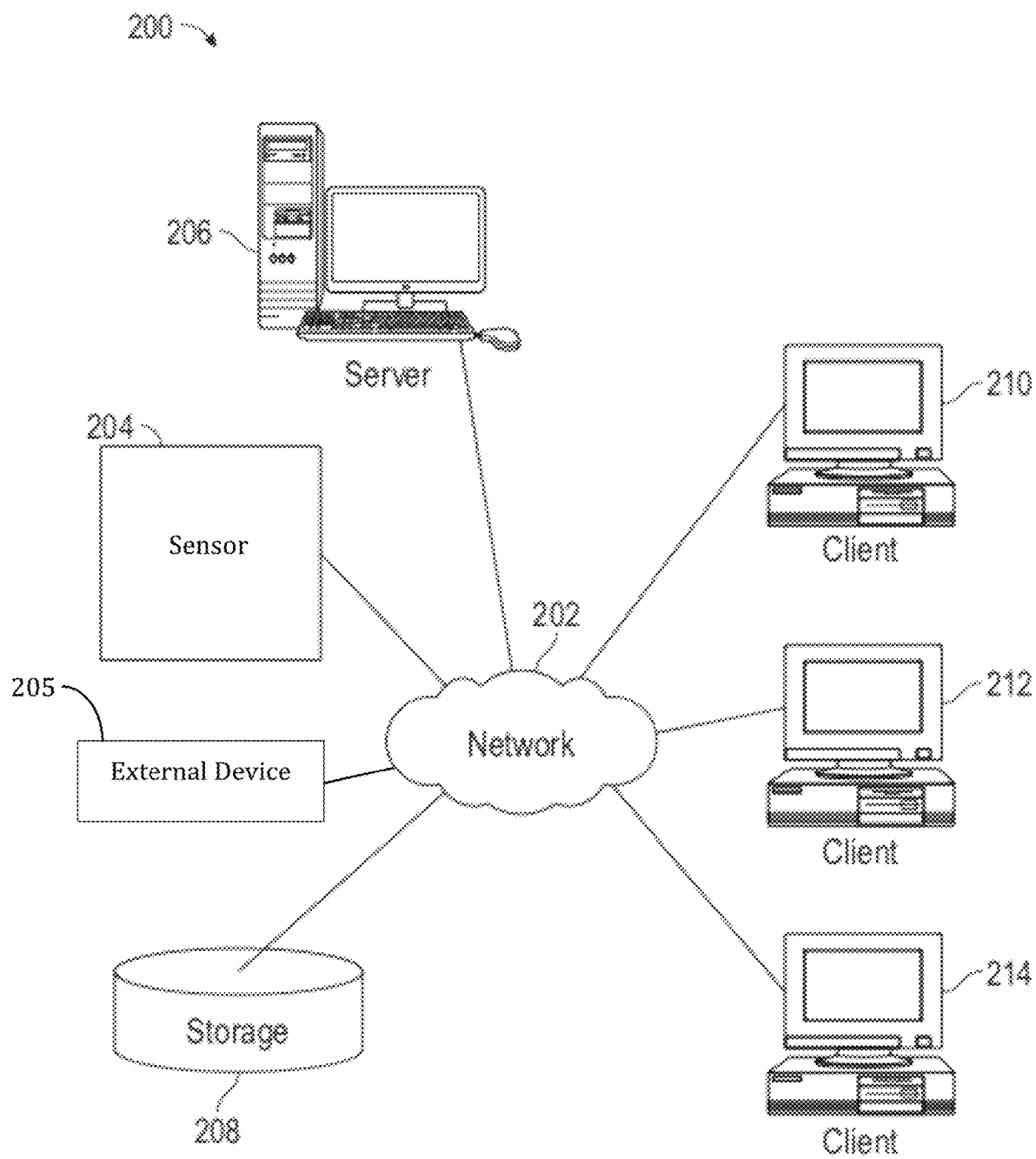
FIG. 2 depicts a graphical representation of a network of data-processing devices in which aspects of the present embodiments may be implemented.
Figure 3:
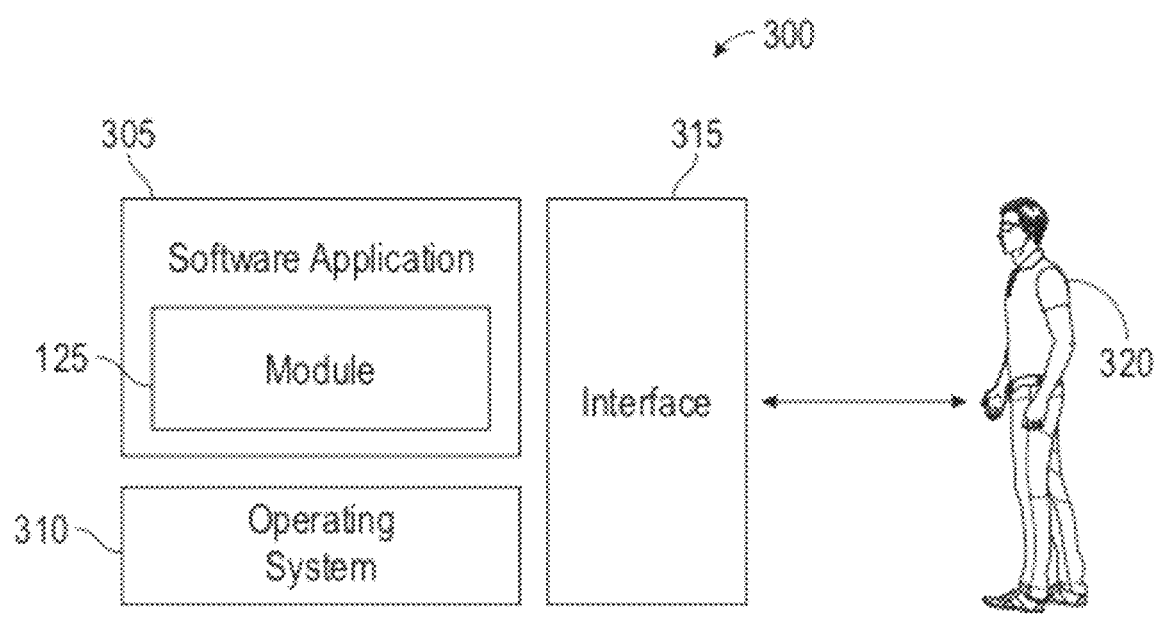
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, remote sensors, detection devices, hand-held devices, multi-function devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth® connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other such devices such as mobile phones, smartphones, sensors, detection devices, and the like in which embodiments of the present invention may be implemented. Note that the system 200 can be implemented in the context of a software module such as program module 125. The system 200 includes a network 202 in communication with one or more clients 210, 212, and 214, and external device 205. Network 202 may also be in communication with one or more RFID and/or GPS enabled devices or sensors 204, servers 206, and storage 208. Network 202 is a medium that can be used to provide communications links between various devices and computers connected together within a networked data processing system such as computer system 100. Network 202 may include connections such as wired communication links, wireless communication links of various types, fiber optic cables, quantum, or quantum encryption, or quantum teleportation networks, etc. Network 202 can communicate with one or more servers 206, one or more external devices such as RFID and/or GPS enabled device 204, and a memory storage unit such as, for example, memory or database 208. It should be understood that RFID and/or GPS enabled device 204 may be embodied as a mobile device, cell phone, tablet device, monitoring device, detector device, sensor microcontroller, controller, receiver, transceiver, or other such device.

In the depicted example, RFID and/or GPS enabled device 204, server 206, and clients 210, 212, and 214 connect to network 202 along with storage unit 208. Clients 210, 212, and 214 may be, for example, personal computers or network computers, handheld devices, mobile devices, tablet devices, smartphones, personal digital assistants, microcontrollers, recording devices, MFDs, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and RFID and/or GPS enabled device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices, multi-processor systems, printers, copiers, fax machines, multi-function devices, data networks, microprocessor-based or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

In the embodiments disclosed herein, a system, method, and apparatus can comprise a kit which combines the use of a green screen or background, a stand for a device such as a tablet device, smart tablet, or smartphone, a selection of objects including different colored cubes, a suit or other articles of clothing (when playing with dolls), various software modules including a smartphone application, and physical toys. Generally, embodiments can include software modules associated with the mobile device for displaying augmented reality content on the mobile device. It should be noted that in certain embodiments, the tablet, computer, smart tablet, or smartphone can be replaced by smart glasses. In such cases, the user won't have to look through a screen, but instead will see everything the software is rendering from a first person point of view.

Figure 4A:
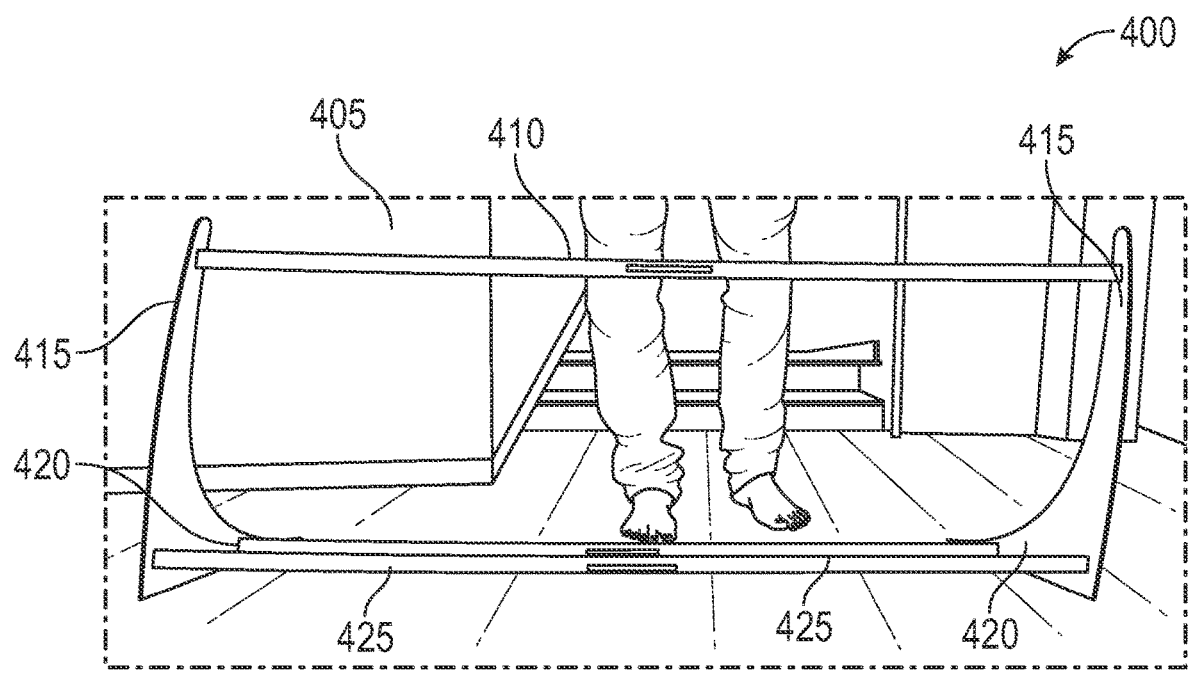
FIG. 4A depicts a screen stand, in accordance with the disclosed embodiments.

In an exemplary embodiment illustrated in FIG. 4A, a system 400 can include a screen stand 405. The screen stand 405 can include a top rail 410 that fits between two risers 415. The risers 415 each have an extended bottom foot 420. A bottom brace 425 can be fitted between the risers 415, one on each of the opposing ends of the extended bottom foot 420. The screen stand 405 can be easily disassembled.

The screen stand 405 serves to create a properly sized (e.g. height and width) support for a green screen 430. The green screen 430 can be sized to create a vertical backdrop 431 along with a horizontal extension 432 upon which items can be set. In certain embodiments, the green screen 430 can comprise a blanket or other such textile. It should be noted that in certain embodiments the screen stand 405 can have adjustable risers and bottom braces so that the user can vary the size of the screen.

In other embodiments, the screen stand 405 can comprise a pop-up assembly. In such embodiments, the screen stand 405 comprises a interconnected assembly configured to pop up into its deployed state. FIG. 4C illustrates assembly of another embodiment of a screen stand 405.

In additional embodiments, the system can further include a t-shirt, top, poncho, or other such article of clothing that can be green (or other such chroma key color). In such embodiments, the user can wear the clothing and the user can serve as the backdrop against which the user device can render the augmented reality as further detailed herein. In such embodiments, the user can play with the toy in a play space between the user device. In certain embodiments, the system can further include chroma key colored gloves, the user can wear to manipulate the toy.

Figure 4B:
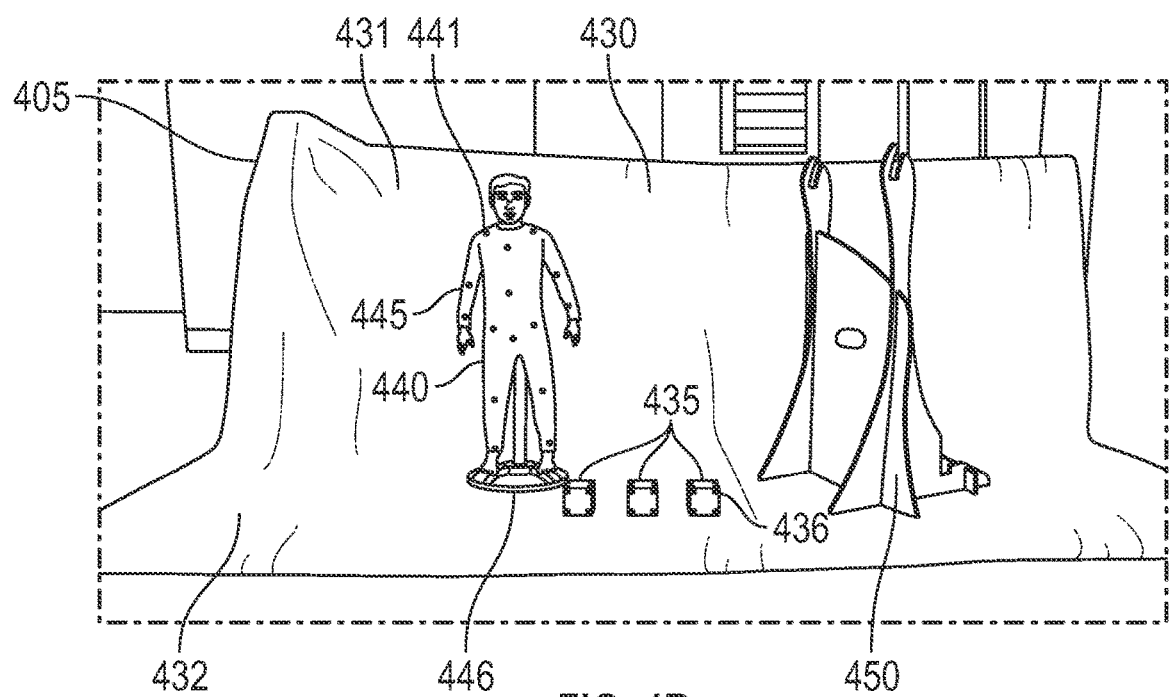
FIG. 4B depicts components in a system for augmented reality play, in accordance with the disclosed embodiments.
Figure 4C:
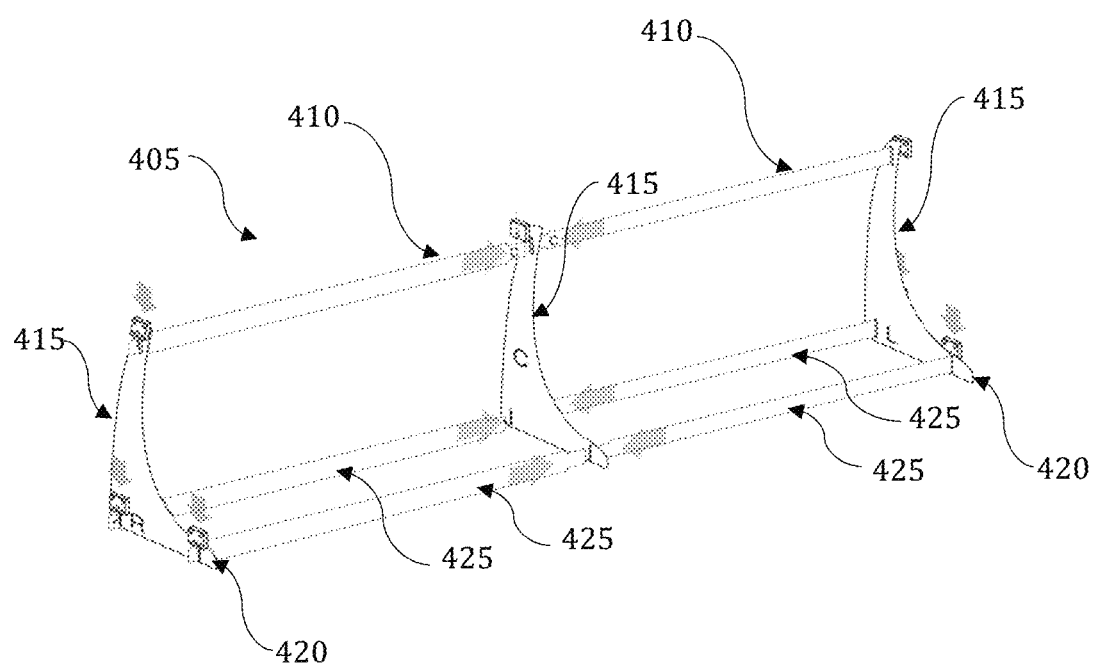
FIG. 4C depicts assembly of a screen stand, in accordance with the disclosed embodiments.

The system can further include at least one, and preferably multiple, blocks 435 as illustrated in FIG. 4B. The blocks 435 can each be selected to be different colors and can include one or more identification or ID dots 436, the use of which is further detailed herein. In certain embodiments, the blocks 435 can be selected to be green cubes (or other such chroma key color). In embodiments where the cubes are selected to be chrome key color, just like the blanket, an object or toy can be placed on top of the cube(s) and the associated augmented reality rendering will appear as though the object is floating.

An ID suit 440 can also be a part of the system 400. The ID suit 440 can be selected to be a specific color and can include various identification dots 441 that the system 400 can use in conjunction with various augmented reality applications as further disclosed herein. It should also be noted that, in certain embodiments, the suit can be replaced with tracking markers in the form of stickers which are placed onto the doll and accomplish the same purpose as the suit or clothing articles.

The system 400 can further include a doll 445, which can be embodied as an action figure, animal, other such figurine, or more generally, any toy. In certain embodiments, the system includes a figurine stand 446. The figurine stand 446 can be colored to match the color of the green screen so that it does not adversely affect the augmented reality rendering. The doll 445, action figure, or figurine can, in some cases, include a fitting that allows the figurine to be mounted on the figurine stand 446.

Figure 5A:
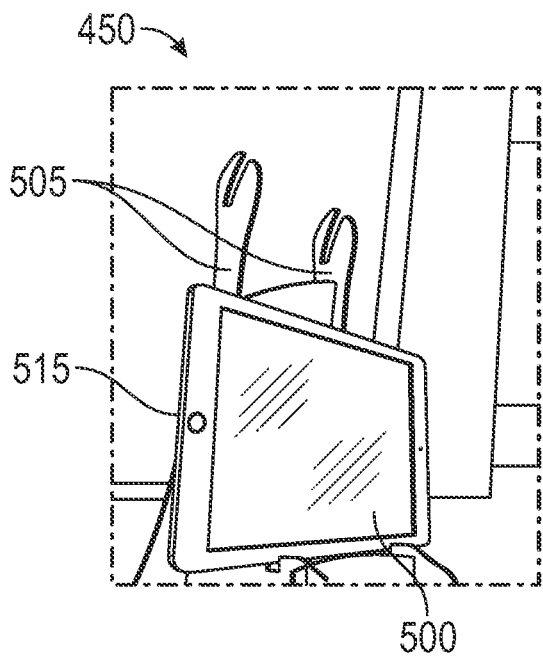
FIG. 5A depicts components in a device stand with a user device in a low position, in accordance with the disclosed embodiments.

The system 400 can further include a device stand 450 configured to house or otherwise hold a mobile device 500. The device stand 450 is further illustrated in FIGS. 5A, 5B, and 5C. In certain embodiments, the device stand 450 can comprise two vertical uprights 505, each of which have a notched foot extension 510. The notched foot extensions 510 are configured to hold a mobile device 500 in a low position 515 as illustrated in FIG. 5A.

The device stand further includes a vertical support 520 that extends between the two vertical uprights 505. The vertical uprights 505 can each include a slot 525 through which the vertical uprights 505 extends. The distance between the vertical uprights 505 can be laterally adjusted to fit the mobile device by sliding the vertical uprights 505 along the vertical support 520.

Figure 5B:
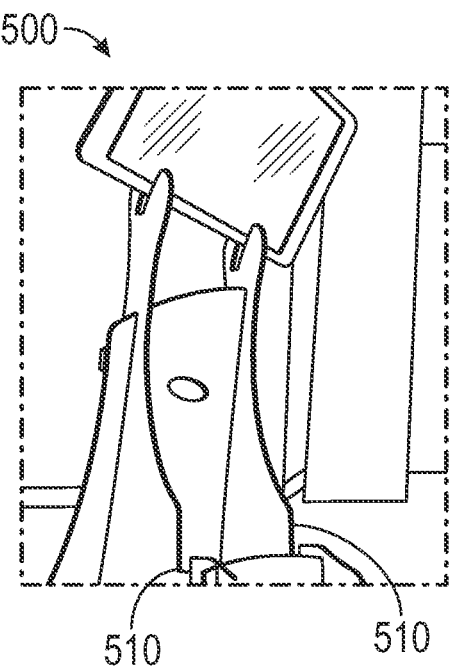
FIG. 5B depicts components in a device stand with a user device in a high position, in accordance with the disclosed embodiments.
Figure 5C:
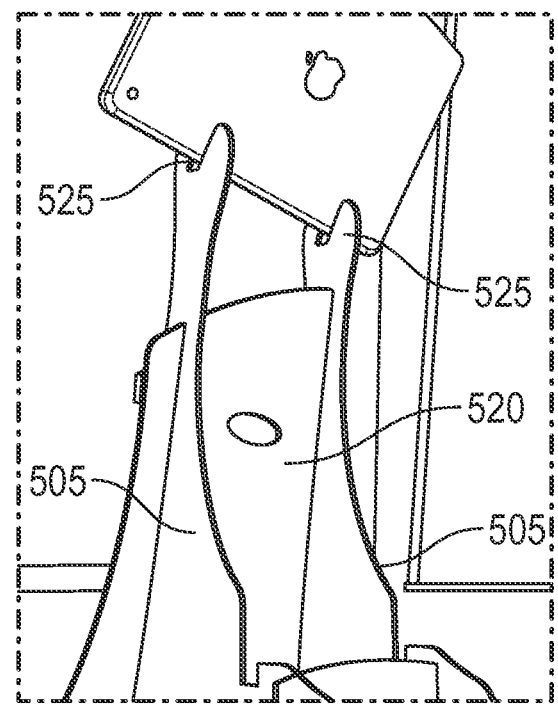
FIG. 5C depicts components in the device stand with the user device arranged in another direction in a high position, in accordance with the disclosed embodiments.
Figure 5D:
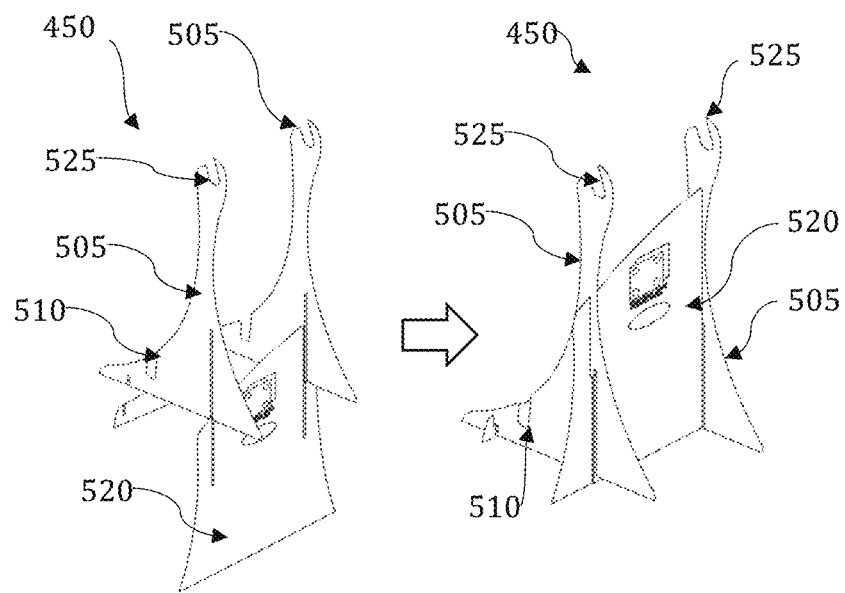
FIG. 5D depicts assembly of a device stand in accordance with the disclosed embodiments.

The top of the vertical uprights 505 can include a top with a slot 525. The slots 525 can be configured to be directly vertical or slightly off vertical, and can be used to hold a mobile device 500 as shown in FIG. 5B and FIG. 5C. In certain embodiments, one of the vertical uprights 505 can be slightly taller than the other such that the orientation of the mobile device 500 is slanted with respect to the horizontal plane. This may be useful in collecting a desirable viewing angle of a play area. FIG. 5D illustrates assembly of an embodiment of the device stand 450.

Figure 6:
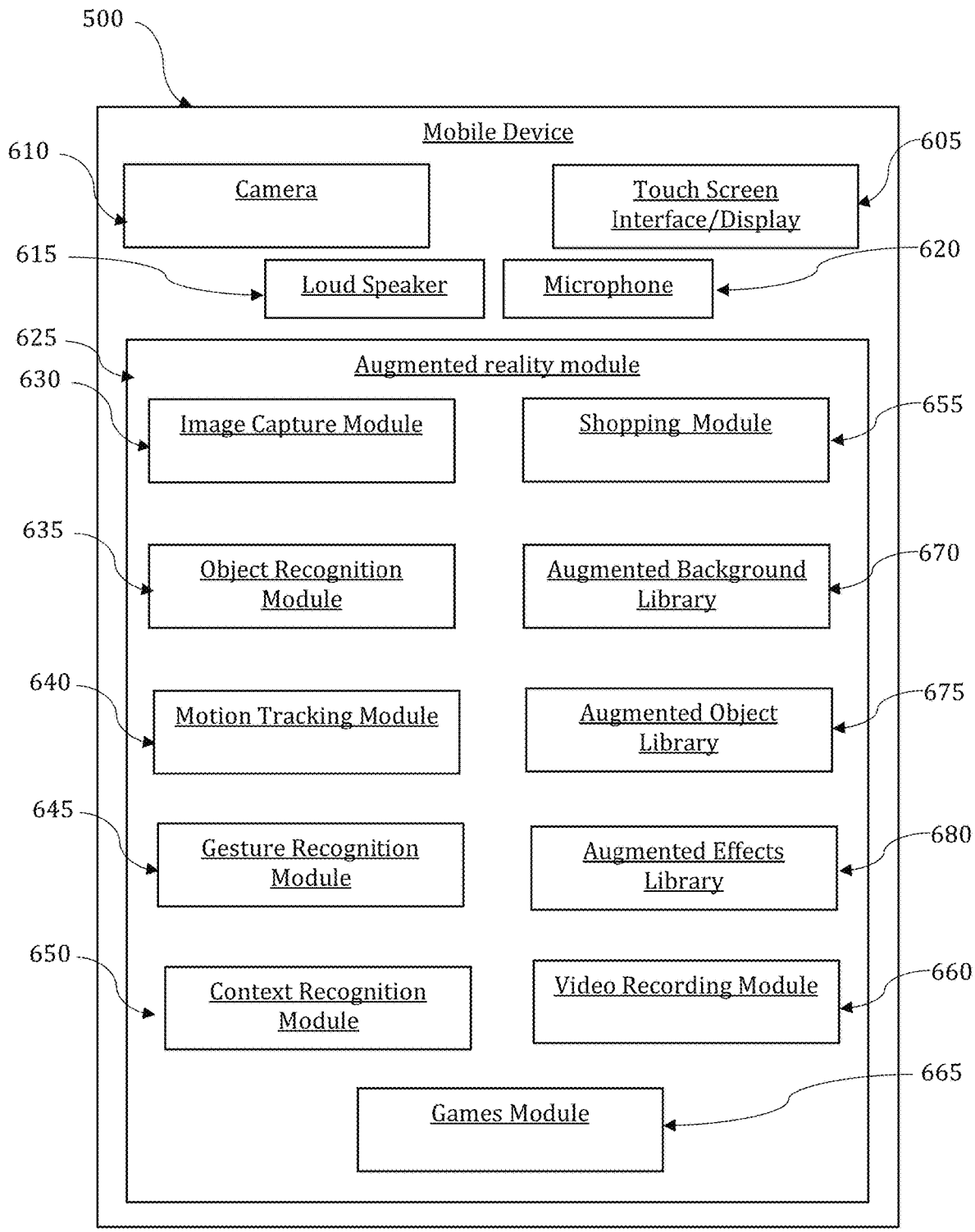
FIG. 6 depicts an augmented reality system, in accordance with the disclosed embodiments.

An embodiment of the mobile device or user device 500 is illustrated in FIG. 6. In certain embodiments, the mobile device 500 can comprise a smartphone, tablet device, or other such device and may be referred to as a mobile device or user device. The mobile device 500 can incorporate some or all of the features illustrated in FIGS. 1-3. The mobile device 500 can include a touchscreen interface and display 605, along with a camera 610. Preferably, the camera 610 associated with the mobile device 500 can comprise a front facing camera and a rear facing camera, but the system can be used with a single camera. The mobile device 500 can further include a loudspeaker 615 and a microphone 620.

The mobile device 500 can be configured with software, most commonly embodied as an application or app module, such as module 125, used for augmented reality processing identified as augmented reality module 625. As used herein, augmented reality refers to a real-time (or near real-time) view of a physical, real-world environment wherein certain aspects of the environment and/or the objects therein are altered. The systems disclosed herein can provide a dynamic reconstruction of the real world with augmented elements using computer graphics technology. As such, the mobile device 500 can include one or more camera 610 which can be embodied as a still or video device(s) used to collect images or video of the real-world environment via the image capture module 630.

The augmented reality module 625 can comprise a combination of hardware and software used for augmented reality processing. The augmented reality module 625 can include various sub-modules including an image capturing module 630, object recognition module 635, motion tracking module 640, gesture recognition module 645, context recognition module 650, shopping module 655, video recording module 660, and games module 665, along with a combination of libraries which can include an augmented background library 670, augmented object library 675, augmented effects library 680, among other possible libraries.

Details regarding the operation of these modules and libraries are further detailed herein.

The system 400 can thus include computer software and/or hardware configured to augment elements of a captured scene. For example, the mobile device 500 can display an augmented reality on a screen or display 605 associated with the device 500. Thus, as the camera 610 collects images or video, the device 500 can modify the associated data so that real world objects displayed on the device 500 appear as a different or modified thing. When the user looks at the augmented reality generated by the augmented reality module 625 shown on display 605, the user sees an augmented view of the physical real-world being captured by the camera 610 associated with the mobile device 500.

Embodiments disclosed herein further provide means for displaying an augmented reality associated with one or more toys or objects on the display 605 of the mobile device 500. The software modules 125 can identify the real world objects in the scene with an object recognition module 635, along with the user's own features (e.g. hands) as they interact with the objects in the scene. The augmented reality module 625 can be configured to identify the object type based on its shape. Additionally, the augmented reality module 625 can analyze geometric information associated with the objects in the scene in order to identify one or more augmented modifications that can be made on the objects in the augmented reality display.

In an exemplary embodiment, a mobile device 500 (e.g. tablet device, smart tablet, or smartphone) can be placed on the stand 450. The camera 610 associated with the mobile device 500 can be oriented to overlook a green screen 430. It should be appreciated that, as used herein, the term "green screen" refers generally to any backdrop used for chroma key compositing, and need not be colored green. In certain embodiments, the green screen 430 can be other colors and can include a solid colored textile draped over a stand to create a vertical backdrop and a substantially horizontal play space or an article of clothing warn by the user. Likewise, in some embodiments, the system can function without a specially configured backdrop and can instead use whatever natural background appears in the frame of the image or video captured by the camera 610.

Figure 7A:
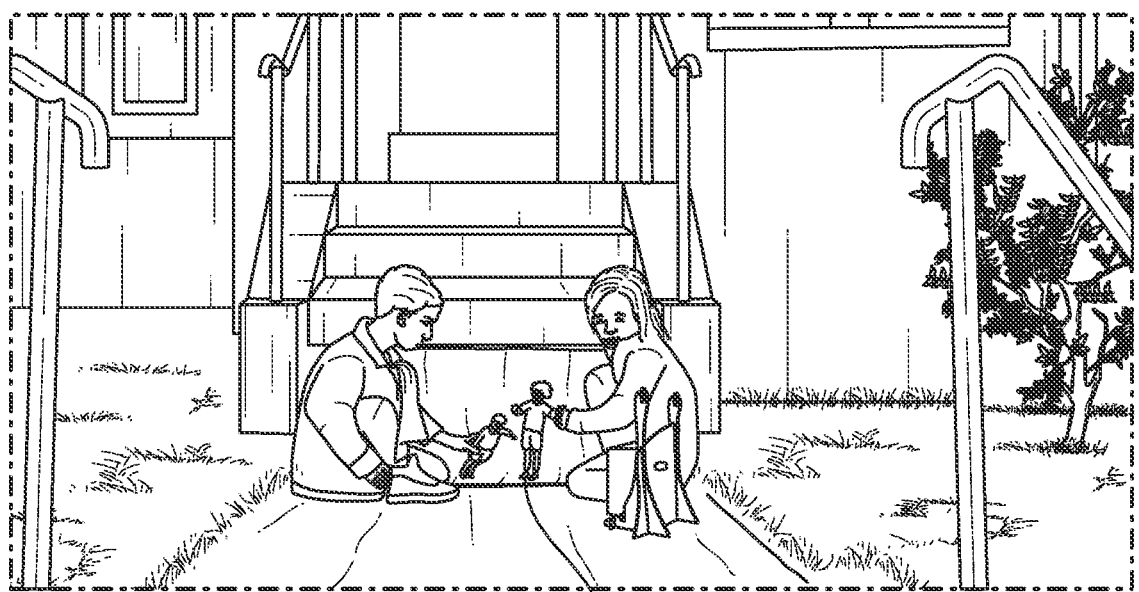
FIG. 7A depicts a play space and components in an augmented reality system, in accordance with the disclosed embodiments.
Figure 7B:
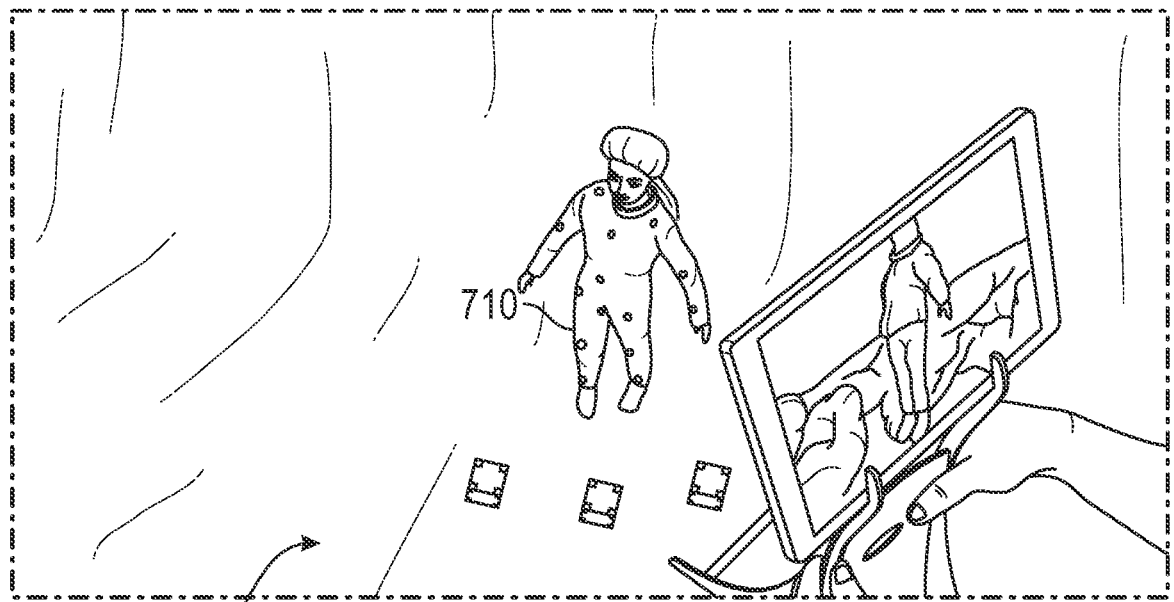
FIG. 7B depicts a perspective view of a play space and components in an augmented reality system, in accordance with the disclosed embodiments.

A play space 705 can be defined as the region between the mobile device 500 and the green screen 430, or other such backdrop, as shown in FIGS. 7A and 7B. Physical toys 710 (e.g. dolls, action figures, etc.) can be introduced into the play space 705. The display 605 associated with the mobile device 500 can be positioned so that it is either facing away from the green screen 430 or facing towards the green screen 430. In the former position, the user (e.g. child, parent, etc.) can view the display 605, with their hands in front of the device's 500 front facing camera 610 (in this case the front facing camera refers to the camera on the same side as the actual display 605 of the device 500) in the play space 705 as illustrated in FIG. 7B. This represents one viable arrangement.

Figure 8A:
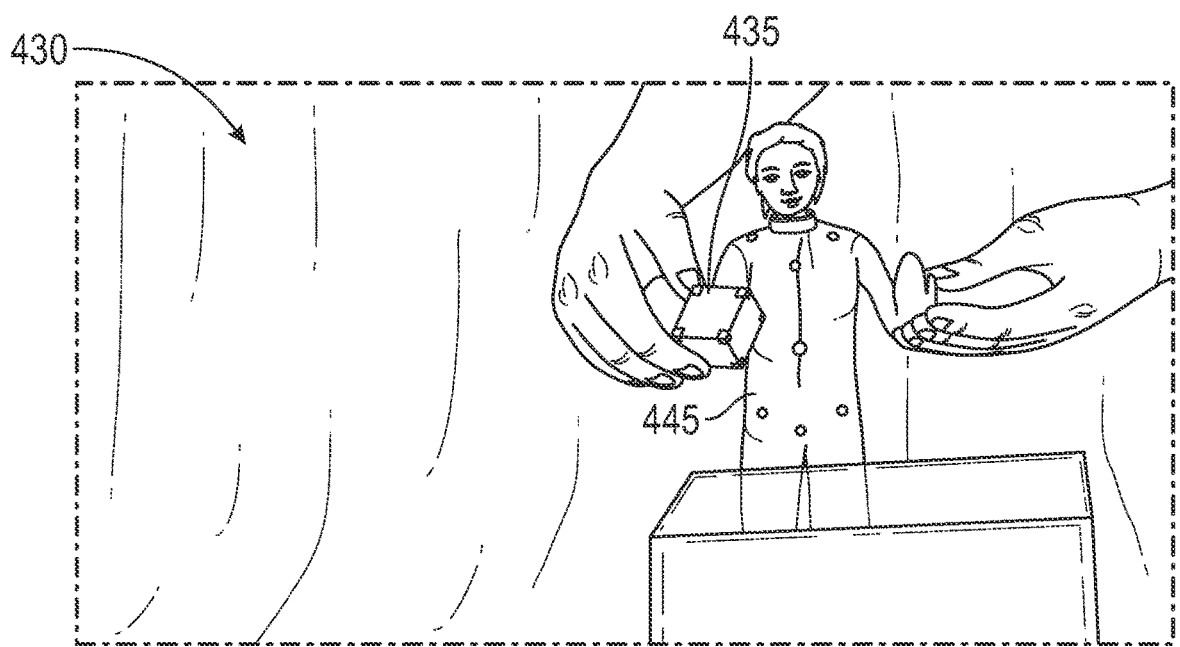
FIG. 8A depicts a user manipulating a toy in a play space, in accordance with the disclosed embodiments.
Figure 8B:
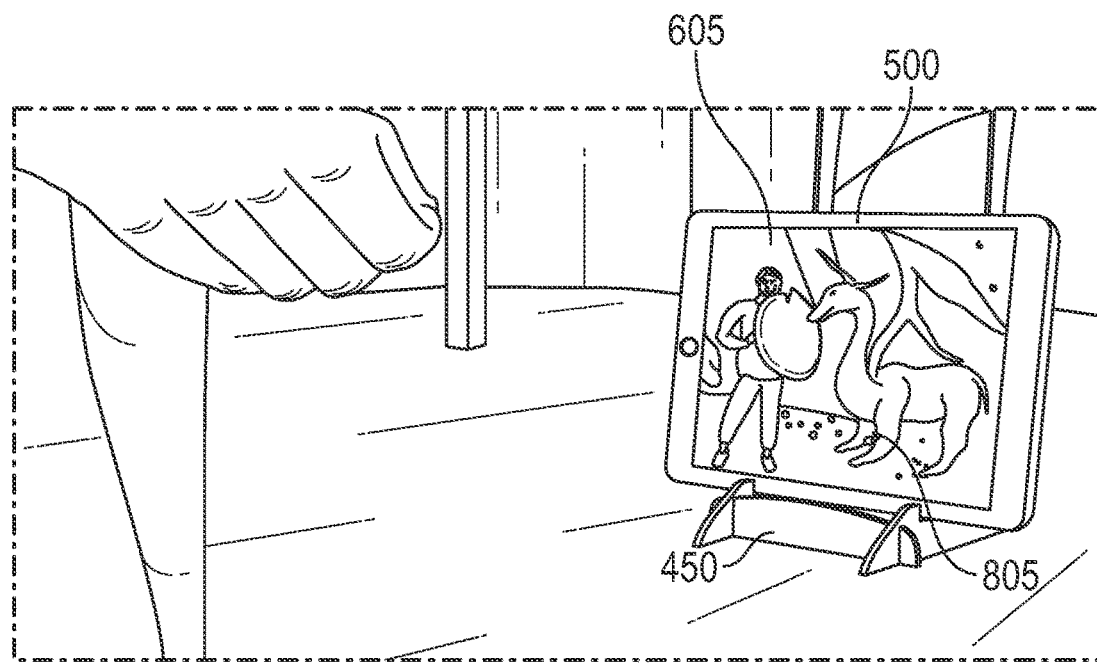
FIG. 8B depicts a user manipulating a toy in a play space and a user device, in accordance with the disclosed embodiments.

In another embodiment, the child's playing hands are directly between the display 605 of the mobile device 500 and the green screen 430. This arrangement sets the stage for various capabilities that can be executed by the system. FIGS. 8A and 8B illustrate a user manipulating various objects in the play space 705.

Figure 8C:
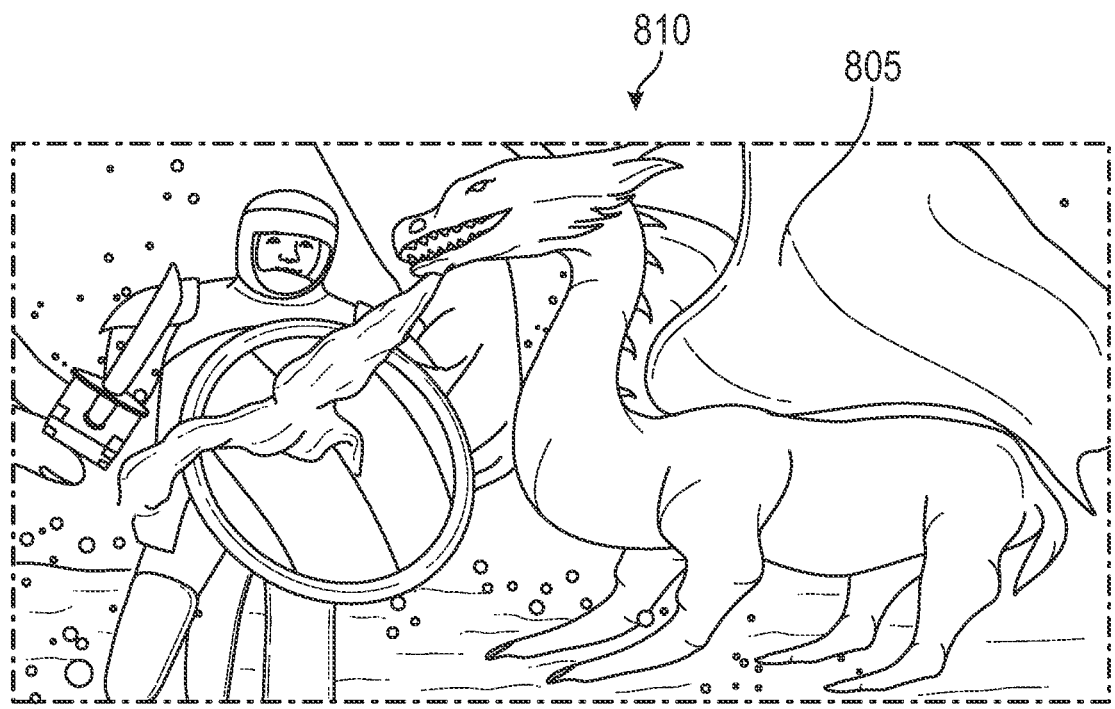
FIG. 8C depicts an augmented reality rendering presented on a user device, in accordance with the disclosed embodiments.

In one embodiment, the augmented reality module 625 can display a virtual background 805 selected from the augmented background library 670 on the display 605 as illustrated in the screen shot 810 of the interface in FIG. 8C. As the user manipulates the objects 435 and toys 445, which can include dolls, action figures, or other real world physical toys, disposed in the play space 705, the background provided on the mobile device 500 can be a photo or video that is stored in the augmented background library 670 and selected via a GUI associated with the interface 605. One possibility is that the user uses a swiping motion or gesture on a touch screen 605 associated with the mobile device 500 to change to a randomly selected background 805 stored in the augmented background library 670. This minimizes user interaction with the app's user interface.

The background 805 can comprise a photo or video. For example, the background 805 can be selected to be the Eiffel Tower, the ocean, a skyline of New York, etc. Corresponding sound effects can be linked with the background 805 and played through the loudspeaker 615. For example, if the user selects a background 805 video scene with rain, the context recognition module 650 can use the context of the background to serve appropriate effects. For example, the context recognition module 650 can use loudspeakers 615 associated with the mobile device 500 to produce associated sounds—e.g. the sound of rain falling, thunder, etc. The context recognition module 650 can further serve to recognize contexts associated with various environments.

The context recognition module 650 can use meta data associated with the background file stored in the augmented background library 670 to pair appropriate effects stored in the augmented effects library 680 with a given background 805. In other embodiments, the context recognition module 650 can comprise a machine learning module that is trained as a classifier to identify certain background characteristics and then pair them with appropriate effects. The context recognition module 650 can thus be embodied as a machine learning classifier in certain embodiments.

Figure 9:
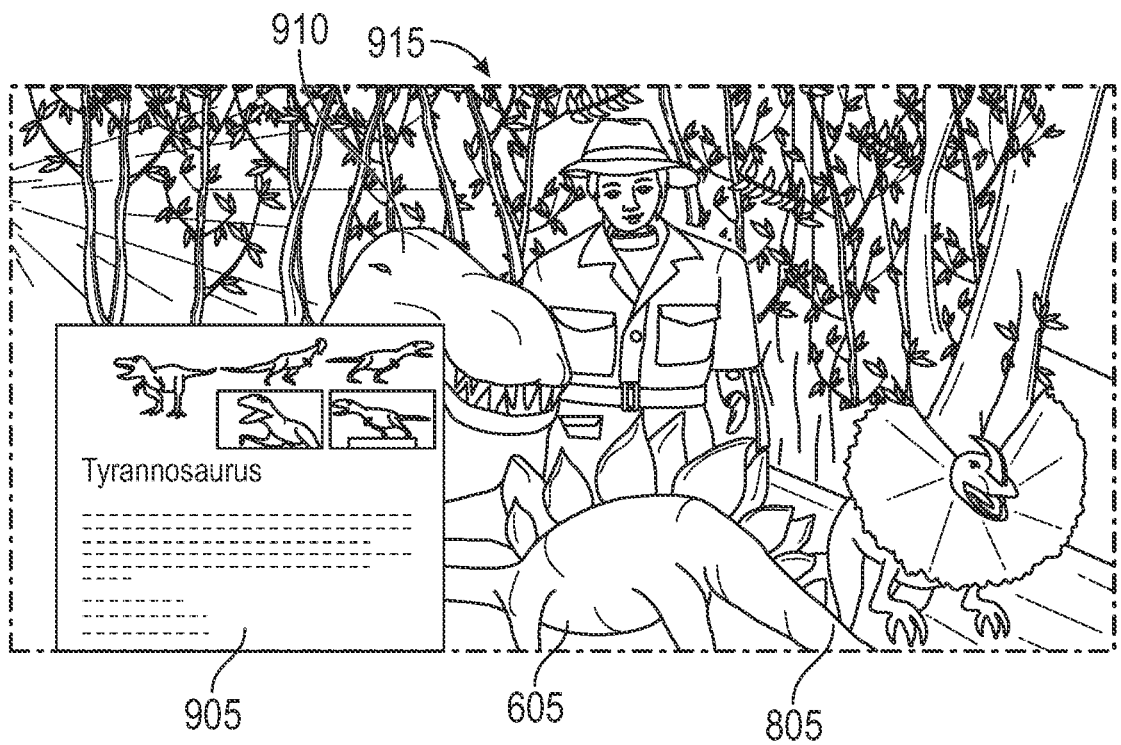
FIG. 9 depicts an augmented reality rendering including an educational pop up window presented on a user device, in accordance with the disclosed embodiments.

As illustrated in the screen shot 915 of the interface provided in FIG. 9, the system can be configured to provide the user educational information about an object displayed in the interface 605, by tapping an "info" icon on the interface 605 of the mobile device 500, which reveals a popup window 905 that provides audio playback and/or textual commentary on the background. In certain embodiments, the system allows the user to tap various objects (e.g. background, the cubes 435, or the suit 440). In FIG. 9 the info is about the cube 435 which is a being rendered by the augmented reality module 625 as a dinosaur 910. The augmented reality module 625 can thus provide educational information as the system can let users read and learn about the different things they see through the augmented reality. For example, when the user selects cube 435 rendered as a dinosaur 910, the system gives the user the opportunity to read, via window 905, about the specific dinosaur they chose, as illustrated in FIG. 9.

The augmented reality module 625 associated with the system is configured to identify a flat surface and divide it into several layers. In certain embodiments, the context recognition module 650 can be further configured to identify a background layer which can display the background (e.g. with an image of the Swiss Alps or other such background image of video); a foreground layer which serves as the play area where projected aspects of the environment are rendered (e.g. snow particles, rain, sun rays, or other such foreground effects); and a camera layer, where the effects are added to the images from the camera itself (for example, the effect of a frozen lens).

In certain embodiments foreground filters can comprise images or objects that are rendered in the augmented reality display. The foreground filters can be configured to be moved around the display with point and drag motions by the user on the touchscreen interface. Likewise, pinch and zoom interactions with the touch screen can be used to resize the foreground filtered object. Pressing on the filter for more than 2 seconds will remove it from the augmented reality rendering.

It should be noted that in some embodiments the use of the green screen is not required. In such embodiments, technology can be used to render the augmented background using augmented reality rendering software. In certain embodiments, the virtual background can be static (like a photo or video), if the mobile device is not moving. If the mobile device is moving, then the systems can provide dynamic 3D backgrounds, in which case the background is three dimensional, giving the user a sense of depth in all angles.

Figure 10A:
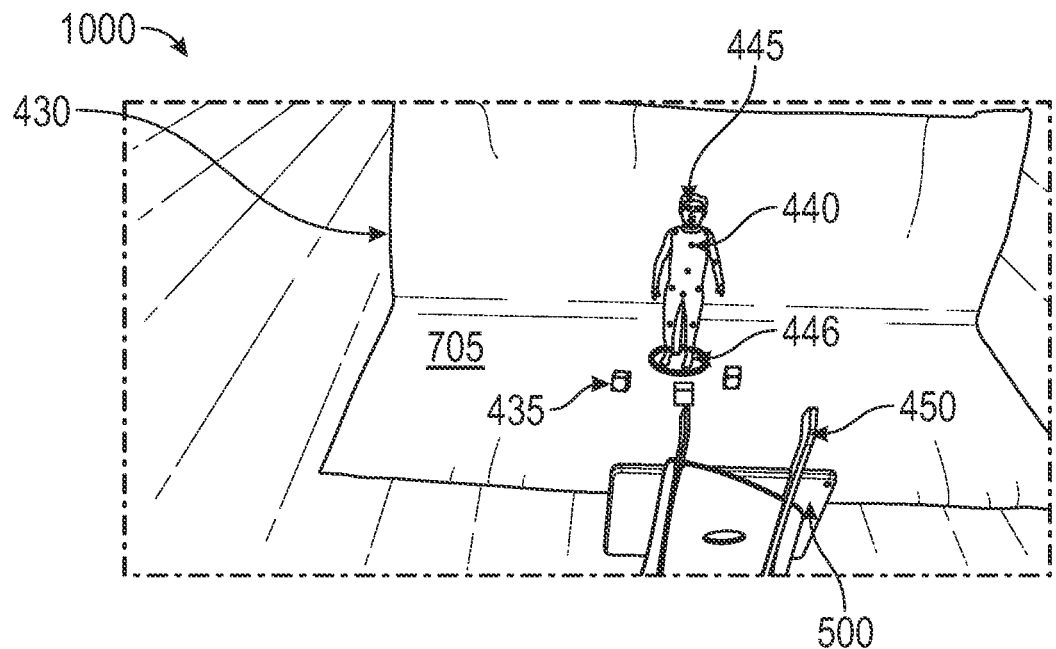
FIG. 10A depicts an augmented reality play system, in accordance with the disclosed embodiments.
Figure 10B:
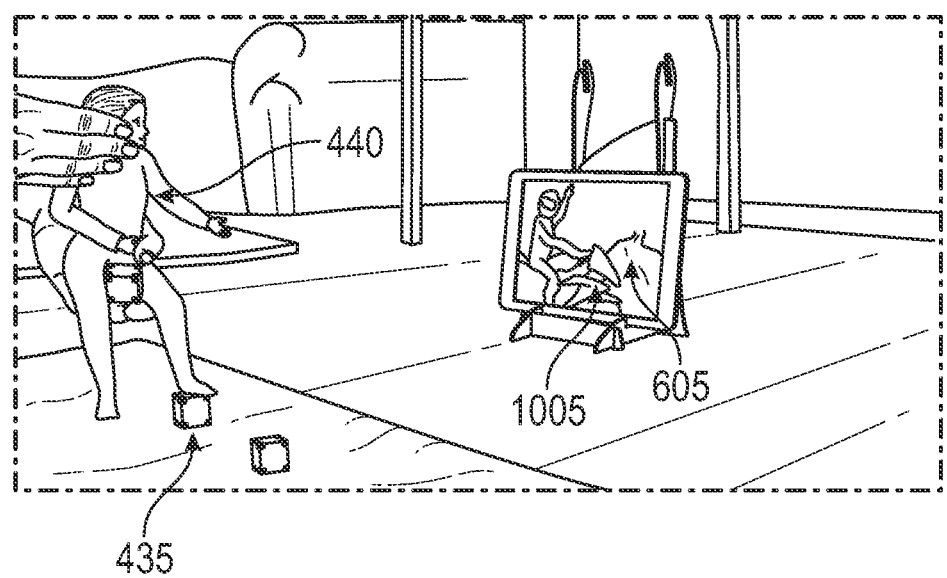
FIG. 10B depicts an augmented reality play system with an augmented reality rendering on a user device, in accordance with the disclosed embodiments.

FIGS. 10A, 10B, and 10C illustrate an augmented reality play system 1000 in accordance with the disclosed embodiments. The system 1000 is premised on the use of augmented reality. The basic concept is that a selection of different colored cubes or blocks 435 are disposed in the play area 705. In the exemplary embodiments disclosed herein three such cubes 435 are used but more or fewer cubes could be used in other embodiments. In one embodiment, the blocks can be cubes, but other shapes might also be used in other embodiments.

The exemplary cubes 435 can each be different colors. For example, one cube 435 can be blue, one can be red, and one can be yellow. Each cube 435 can include 4 dots 436. The ID dots 436 can comprise depression in the corners of each of the 6 sides of the cube, colored white. The dots 436 allow the augmented reality module 625 associated with the mobile device 500, to recognize the cubes' 435 location and distance relative to the camera 610 on the mobile device 500. Using augmented reality, the augmented reality module 625 can render the cubes 435 on the display 605, virtually as a toy or other object. As the user interacts with the cubes 435 in front of the mobile device's camera 610, the cubes 435 are rendered on the display screen 605 as a toy of the user's choice, selected from the augmented object library 675. The augmented reality module 625 includes the augmented object library 675, which is a digital library of object files of many different items organized by category for the user to select.

FIG. 10B shows the blocks 435 in the real play environment 705, as illustrated in FIG. 10A, rendered as a virtual object 1005, in this example, a motorcycle rendered via the augmented reality module 625. A library of augmented objects 675 can be provided that stores data for rendering possible object choices.

For example, if the user wants a boat, a dog, and a table, the user can place the cubes 435 in front of the camera 610 associated with the mobile device 500. The user can then use the touch screen interface 605 to browse a selection of augmented reality objects to be rendered in the position of each of the cubes 435. The user can select a boat which will cause the system to render the subject cube 435 as a boat, a dog which will cause the system to render the next cube 435 as a dog, and a table which will result in the third cube 435 being rendered as a table.

Corresponding sound effects stored in the augmented effects library 680 can be linked with the augmented reality as well. For example, if the cube 435 is rendered as a dog, a barking sound can be generated by the augmented reality module 625. Sound effects can be initiated automatically or can be produced on demand according to a user gesture associated with the touch screen interface 605.

In another embodiment, the user can use a queue preformed on the cube 435 itself to initiate selection of a rendering. For example, in an embodiment the user can tap a cube 435 on the underlying surface in the play area 705 in view of the camera 610 associated with the mobile device 500. The gesture recognition module 645 associated with the augmented reality module can recognize that movement as a queuing movement, and change the rendering of the cube 435 on the display 605 to another item. In this way, each new tap will yield a new surprise accessory.

In another embodiment, the augmented reality module 625 can use the selected background to automatically assign rendering criteria for each cube 435. For example, if the user has already selected an ocean background, the augmented reality module 625 can automatically render the cubes 435 as a fish, a dolphin, and corral or other such context relevant objects on the display 605.

Figure 11A:
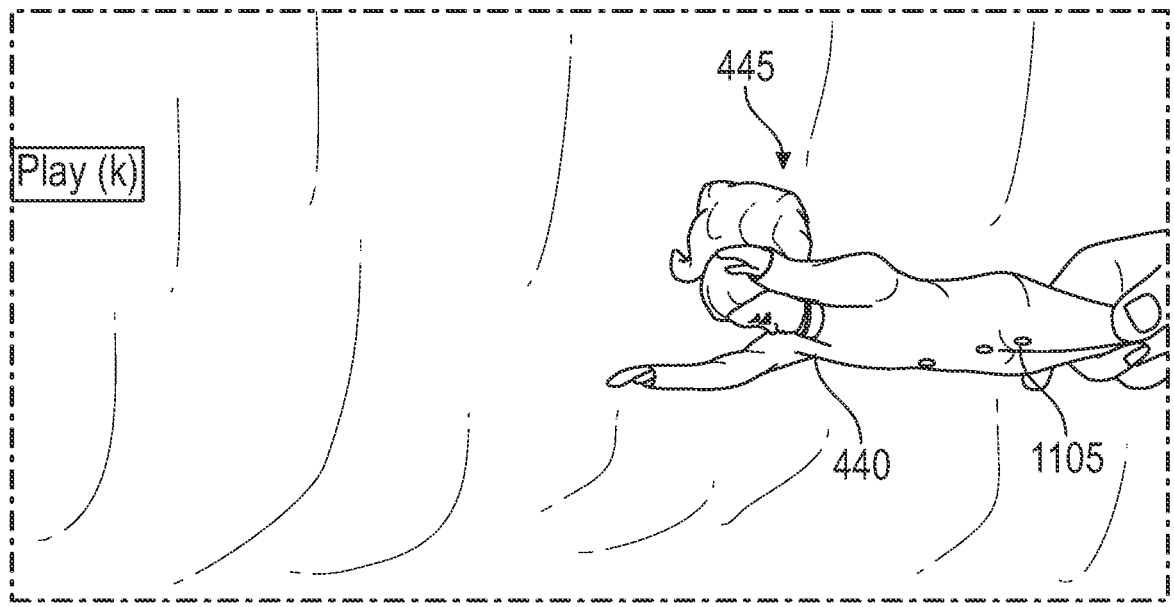
FIG. 11A depicts a user interacting with a toy in a play space, in accordance with the disclosed embodiments.
Figure 11B:
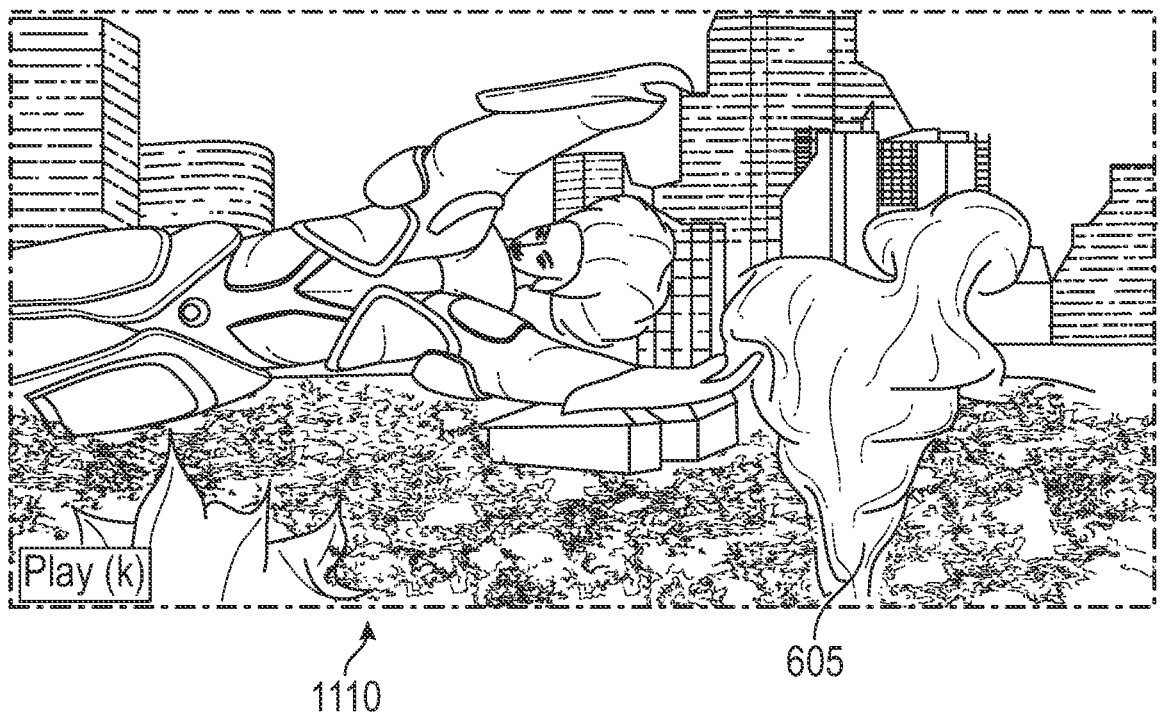
FIG. 11B depicts an augmented reality rendering of the user interacting with the toy presented on a user device, in accordance with the disclosed embodiments.

The system can further be configured to include a tracking suit 440 when play is initiated with dolls. The suit 440 is shown on a doll 445 in FIG. 11A. The suit 440 can include ID dots 1105 and can allow users, via augmented reality on display 605, to select a fashion, style, or outfit from a augmented object library 675. The ID dots 1105 allow the augmented reality module to identify the location of the suit at any given point in time. The augmented reality module 625 can then render the selected clothing on the doll 445 in augmented reality as illustrated in the screenshot 1110 of the interface in FIG. 11B. The function mirrors that of the aforementioned cubes 435 in terms of how the user selects what the suit is, in augmented reality.

The augmented reality module 625 can be further configured to make use of specific augmented toys. In such embodiments, instead of cubes, the accessories can be specific objects. For example, the accessories could be a sofa, a table, a figurine shaped like a person, etc. Each specific object, in real life, is completely blank (e.g. white color) except for tracking markers (or id dots) used by the system to properly identify the object and its location. The tracking markers allow the system to accurately provide the augmented reality rendering. The system then uses augmented reality to overlay any design desired on the object in the virtually rendered display 605. This means that tactile sensation of manipulating the object matches what the user sees as they view the object in augmented reality, providing for a more realistic experience.

In yet another embodiment, augmented reality can be used in association with everyday objects. For example, the system can include an ultraviolet or thermal imaging device. The system can use data collected by the thermal imaging device to recognize that the user is holding something cold (e.g. an ice cube) or something hot (e.g. a cup of hot chocolate). When the system identifies something of a certain temperature the context recognition module 650 can adjust the rendering of that object accordingly. For example, if the thermal image data suggests the object is an ice cube, the object can be rendered on the augmented reality display 605 as a huge ice ball. In other words, the system can render an exaggerated virtual rendering of the real world object. If the user is holding a rock, the object recognition module 635 can recognize the rock and render it as a huge boulder in augmented reality.

More generally, the augmented reality module 625 can search the image data for unique objects in the camera frame. The object recognition module can be used to identify object features such as object geometry, thermal data, color combination, etc. When the object recognition module identifies the object, relevant augmented objects from the augmented object library can render content associated with the identified real world object.

Various aspects of the disclosed embodiments rely on motion capture functionality. The augmented reality module 625 can recognize the motion of an object, doll, toy, etc. and can animate certain things and/or emit sounds when specific motions are detected using a motion tracking module 640. For example, If a user is playing with an action figure and smashes it on the ground, the augmented reality module 625 can recognize that the figure collided with the ground. The motion tracking module 640 can use motion capture to identify object motion. In the case where a collision is detected, a contextually appropriate effect from the augmented effects library can be rendered. For example, at the point of collision the augmented reality module can animate an explosion on display 605 as the object hits the ground.

In another example, if user imitates a flying motion for an object, such as doll 445, or other such object, the motion tracking module 640 can recognize this movement and render a contextually appropriate background stored in the augmented background library 670, such as a cloud background.

In another exemplary embodiment if a horse were presented virtually in the background layer, the gesture recognition module 645 can recognize contextually appropriate gestures associated with the virtual objects, such as the horse being "petted" by a toy or a user's hand. The augmented reality module can automatically serve a contextually appropriate effect, such as a neighing horse sound effect stored in the augmented effects library 680.

In certain embodiments, the augmented reality module 625 can track the position of an object in space with the motion tracking module 640. The augmented reality module 625 can further be configured to recognize surrounding flat surfaces with the context recognition module 650. A special augmented effect, served from the augmented effects library 680 can appear when the figure is moving. The speed of the object can be determined by calculating the position of the figure between the collected frames. When the object collides with a flat surface (and/or other conditions are met) an explosion animation can be generated and played, and the specified effect can be turned on.

Figure 12A:
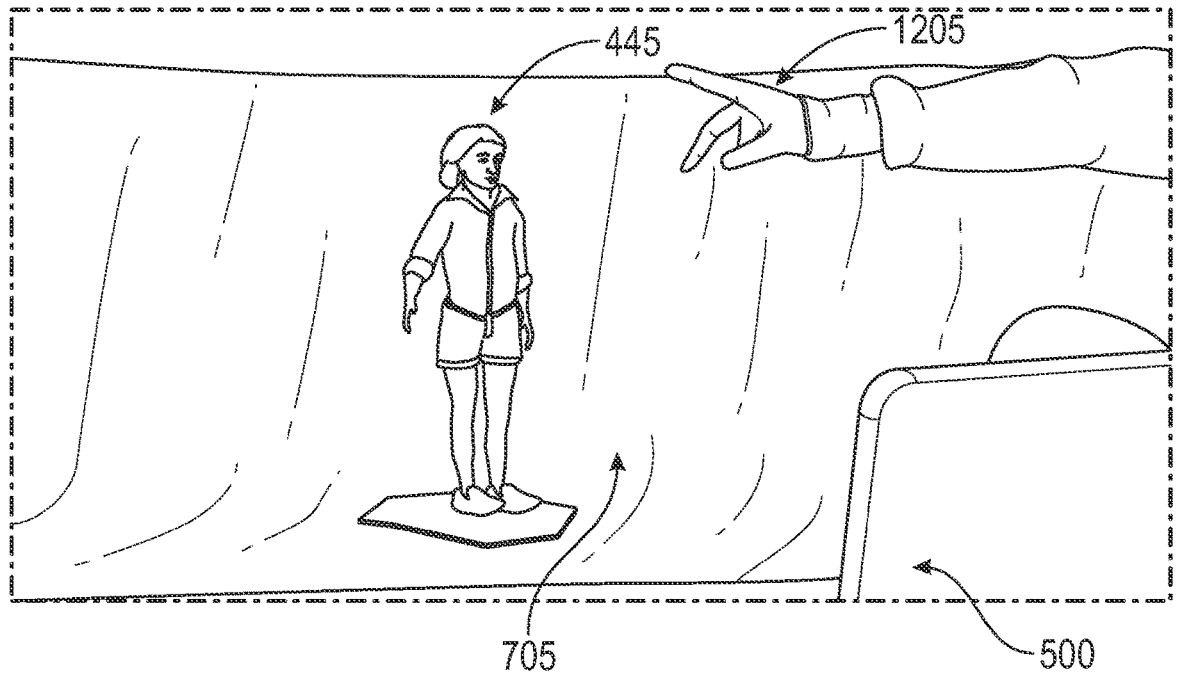
FIG. 12A and FIG. 12B depict a user gesture in a play space, in accordance with the disclosed embodiments.
Figure 12B:
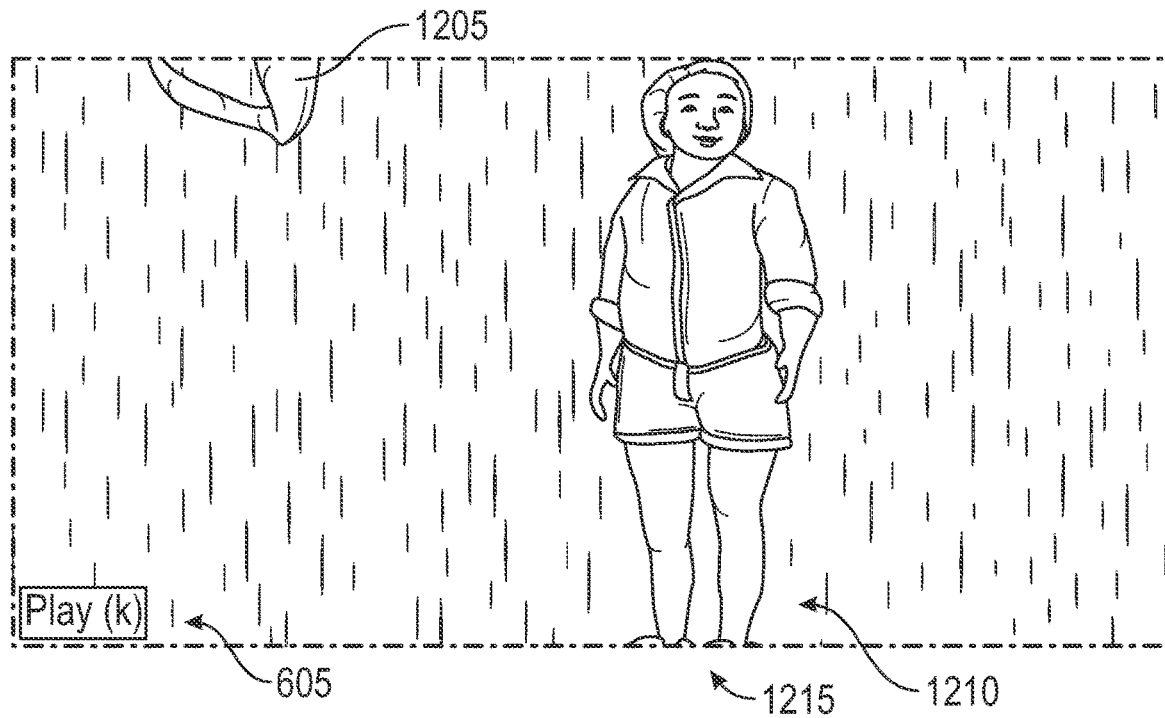

In certain embodiments, the system can include a gesture recognition module 645 used to take advantage of gesture recognition technology, to enhance the experience of playing with the object as shown in FIG. 12A and in screen shot 1215 in FIG. 12B. When the user makes gestures with one, or both hands (in many cases this is the hand not holding the doll or action figure), the movement of the hand(s) can be captured. The gesture recognition module 645, can compare the captured motion to preset gestures. If there is a match the gesture recognition module 645 can identify the gesture as an instruction that triggers a corresponding action. In an exemplary case, the gesture can trigger an animation associated with the augmented reality rendering on display 605.

Gesture recognition can be accomplished by the gesture recognition module 645 using computer vision technology. Computer vision technology generally refers to methods and systems (often comprising computer hardware and software) for collecting and processing digital image data. In the embodiments disclosed herein, this can include the transformation of visual image data collected by the camera 610 associated with the mobile device 500, into data that can be used to control or modify the augmented reality processing and rendering by the augmented reality module 625.

In an exemplary embodiment, computer vision technology can be used to detect fingers in the frame of image data. The augmented reality module 625 can then assign each finger a unique ID. The motion tracking module 640 tracks transformations in space for each of the uniquely identified fingers. If any of the fingers changes its position, the method of comparing the position with the gesture dictionary is applied by the gesture recognition module 645. If there is a match, a related action can be invoked. One such example might be the use of a finger wiggling gesture in front of the camera 610 to queue a virtual rain effect rendering on the display 605.

FIG. 12A shows a user making an exemplary finger gesture 1205 in view of the camera 610 associated with device 500. It should be appreciated that this gesture is meant to be exemplary and many other gestures can also be used in other embodiments. FIG. 12A illustrates a rain gesture. When the user makes the rain gesture the gesture recognition module 645 can identify the gesture 1205, and can render rain animation effect 1210 in the virtual scene on display 605 as shown in FIG. 12B.

The system can further include a switching animals gesture. When the user makes this gesture, the user's hand can cycle through a library of different animals. For example, the user's hand can be animated to be a cat. When the user makes the switching animal gesture, the user's hand is changed to another animal and rendered as for example, a dog. Another exemplary gesture can be a biting gesture. Once the user has selected an animal, the user can make a biting gesture and the animated animal can be rendered as biting.

The augmented reality module 625 can be further configured to provide a hologram mode. The hologram mode can include a single player and multiplayer option. For example, in certain embodiments, two users can select an option that enables "hologram mode." In hologram mode, an object (e.g. the doll, action figure, cube, or another physical toy) can render on one side of the display. The image video texture with the other user's object (e.g. doll, action figure, cube, or another physical toy) along with the user's hand, if it is visible, is on the other side. Both participants have the ability to switch through virtual backgrounds and both players can communicate (via voice chat, video chat, etc.).

In hologram mode, the users' can supplement their physical toys with augmented reality, motion tracking via motion tracking module 640, and/or gesture recognition with a gesture recognition module 645. In other embodiments the users can simply use these features without the physical toy. For example, if the user is playing with an action figure, the other user can make a gesture which can be identified and processed via the gesture recognition module 645, which creates a rendering of an explosion on a display 605.

Automatic detection is another function possible using the augmented reality module 625. For example, if a doll 445 is wearing a firefighter outfit, the object recognition module can be trained to identify the appearance and/or color combinations of the outfit, and augmented reality module 625 can display a virtual background of a fire station from the augmented background library 670. In addition, the augmented reality cubes 435 can automatically switch to contextually appropriate objects, that is, for example, objects associated with being a firefighter (e.g. a fire truck, a fire hose, and a fire animation or effect).

In certain embodiments, the object recognition module 635 can further identify the type or characteristics of a physical toy in view of the camera 610. The augmented reality module 625 can then automatically display a virtual background from the augmented background library, and associated augmented objects or effects that are contextually appropriate for the identified object.

More generally, the augmented reality module 625 can be configured to search for unique objects in the camera frame, such as object geometry, a QR code, and/or a color combination. The object recognition module 635 can attempt to identify the object. If a match is identified, the augmented reality module 625 can serve contextually appropriate content associated with the identified object. In other embodiments, the augmented reality module 625 can use automatic detection using a QR code embedded into the suit 440 or via a symbol which is recognized by the object recognition module 635 through the front or rear facing camera 610 of the mobile device 500.

Figure 13:
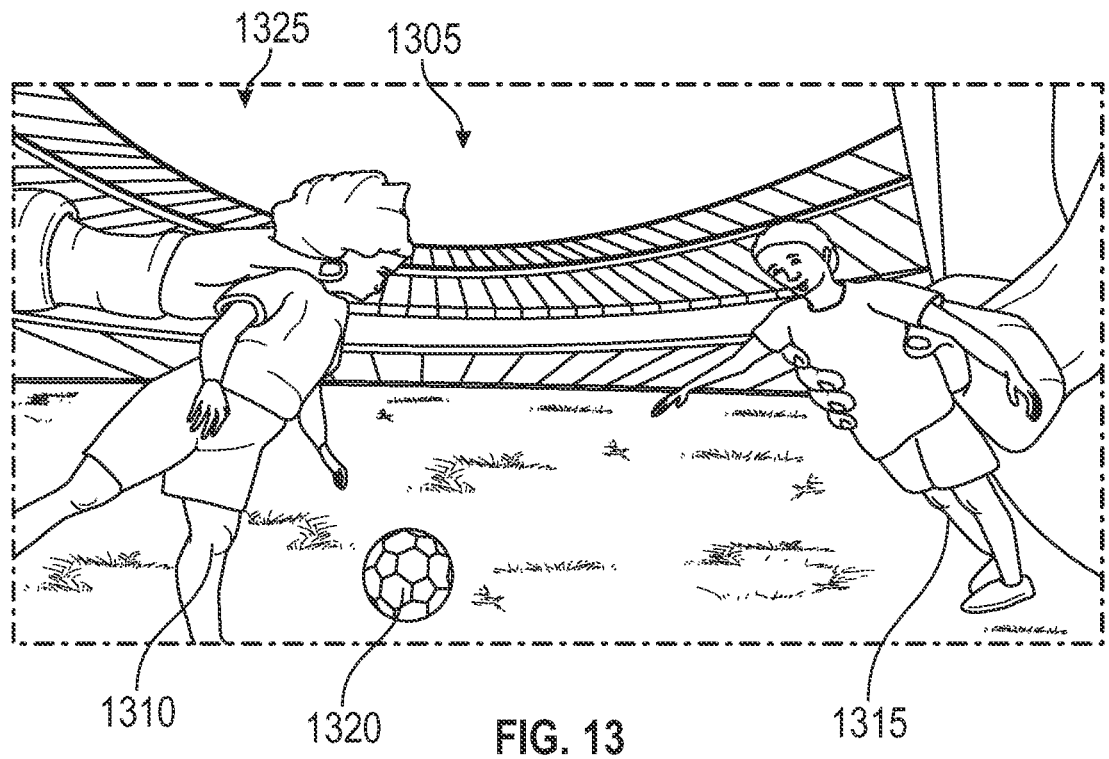
FIG. 13 depicts an augmented reality rendering of a game mode, in accordance with the disclosed embodiments.

The system can further include a game mode provided by games module 665. A rendering of the display 605 during a game mode is illustrated screen shot 1325 in FIG. 13. The games module 665 allows the augmented reality module to identify and record the position(s) of one or more objects or toys via object tracking completed by motion tracking module 640. The games module 665 can render that information into a game scene 1305. For example, if two users are in game mode, one toy 1310 can be rendered by the augmented reality module 625 as a goaltender protecting a soccer net. The other object 1315 can be rendered as a striker kicking a virtually rendered soccer ball 1320 and trying to get the virtual ball 1320 in the virtually rendered soccer goal. In another exemplary game, the object of the game would be to pop as many falling balloons as possible. It should be appreciated that this represents two possible games that can be presented using the system but many other games can also be served using the system.

In other embodiments, the games provided via the games module 665 can include educational games. In an exemplary embodiment, an animated character render by the augmented reality module, can give a user's doll 445, action figure, or other physical toy, specific tasks to complete. The completed tasks can be rewarded with points, and points can result in the user moving up a level, etc.

In another embodiment, the games module 665 can provide an adventure mode. In adventure mode the augmented reality module 625 can guide the user through a story where the user can pick and choose what happens. For example, in a "Paris Adventure" the user can virtually travel through an augmented reality rendering of Paris on the user device. An animated tour guide character can guide the user through various augmented reality tasks and places associated with the Paris adventure.

For example, in an embodiment the user's doll 445 can be rendered as a firefighter. The user can purchase an expansion pack using shopping module 655, for the firefighter rendering, which can include the addition of accessible backgrounds in the augmented backgrounds library 670, accessible objects in the augmented object library, and accessible effects in the augmented effects library. In the exemplary case of the firefighter expansion pack, the newly accessible features can include a firefighter outfit and other accessories.

The animated character can instruct the user on how to put the virtual firefighter outfit on the rendering of the doll 445. The user can then put the firefighter outfit on the doll as described by the character. The augmented reality module 625 can use target transform recognition to recognize that the task has been completed at which point the player can be prompted to proceed to the next step. The next step could be, for example, a task given by the animated character to the user, explaining how to properly use a fire hose. The animated character can specify the approximate angle of the hose. The motion tracking module 640 can recognize when the user properly matches the prescribed angle with the doll's fire hose. The educational game can proceed accordingly, as the user completes tasks given by the animated character.

Figure 14:
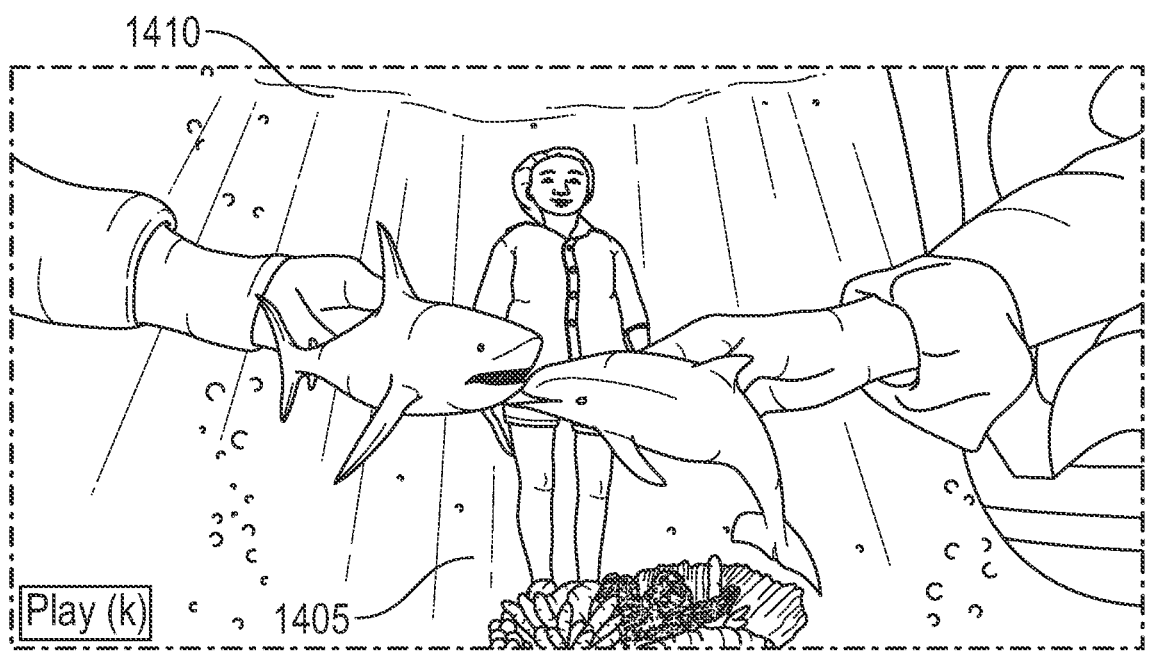
FIG. 14 depicts a video frame in a recorded augmented reality rendering, in accordance with the disclosed embodiments.

The augmented reality module 625 can further include a video recording module 660 that allows the user to video record anything that is rendered on the display 605 of the mobile device 500. A screenshot 1405 of such a recording is provided in screen shot 1410 in FIG. 14. This way, users can save and share videos of their playing and become amateur filmmakers.

The augmented reality module 625 can further provide virtual shopping with a virtual shopping module 655. Though augmented reality will allow users to replace physical accessories with augmented accessories, the augmented accessories can also serve as previews for toys that kids/parents might purchase in the real world. For example, the augmented reality module 625 can render a dinosaur via augmented reality. The system can include a feature that allows the user to purchase the same virtually rendered dinosaur toy in physical form via the shopping module 655. In certain embodiments, this can include a file of instructions that can be provided to a 3D printer for printing the virtually rendered object on a 3D printer.

Figure 15:
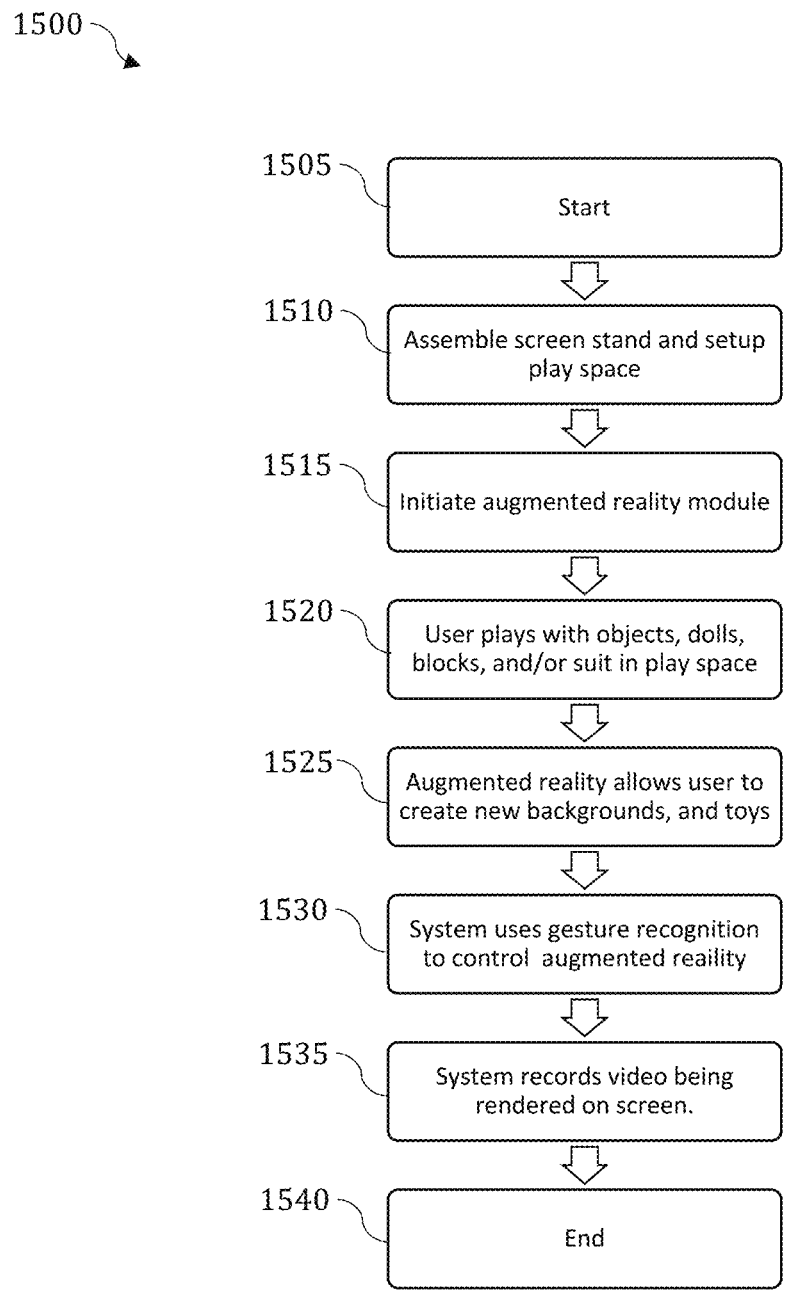
FIG. 15 depicts an steps in a method associated with an augmented reality play system, in accordance with the disclosed embodiments.

FIG. 15 illustrates a flow chart of steps associated with a method 1500 for enhancing a play experience in accordance with the disclosed embodiments. It should be appreciated that the order and frequency of the steps in method 1500 are exemplary, and in other embodiments, the order of steps can differ and one or more of the steps can be repeated one or more times. In other embodiments, certain steps can be performed concurrently as necessary to realize the desired augmented reality rendering. The method starts at step 1505.

In general, at step 1510 the user can assemble the stand and screen and adjust the mobile device to define the play space. At this point, the user can initiate the augmented reality rendering on the mobile device as shown at 1515. The augmented reality system can display instructions on the interface for initiating play, along with touch sensitive interface buttons for various purposes.

Figure 16:
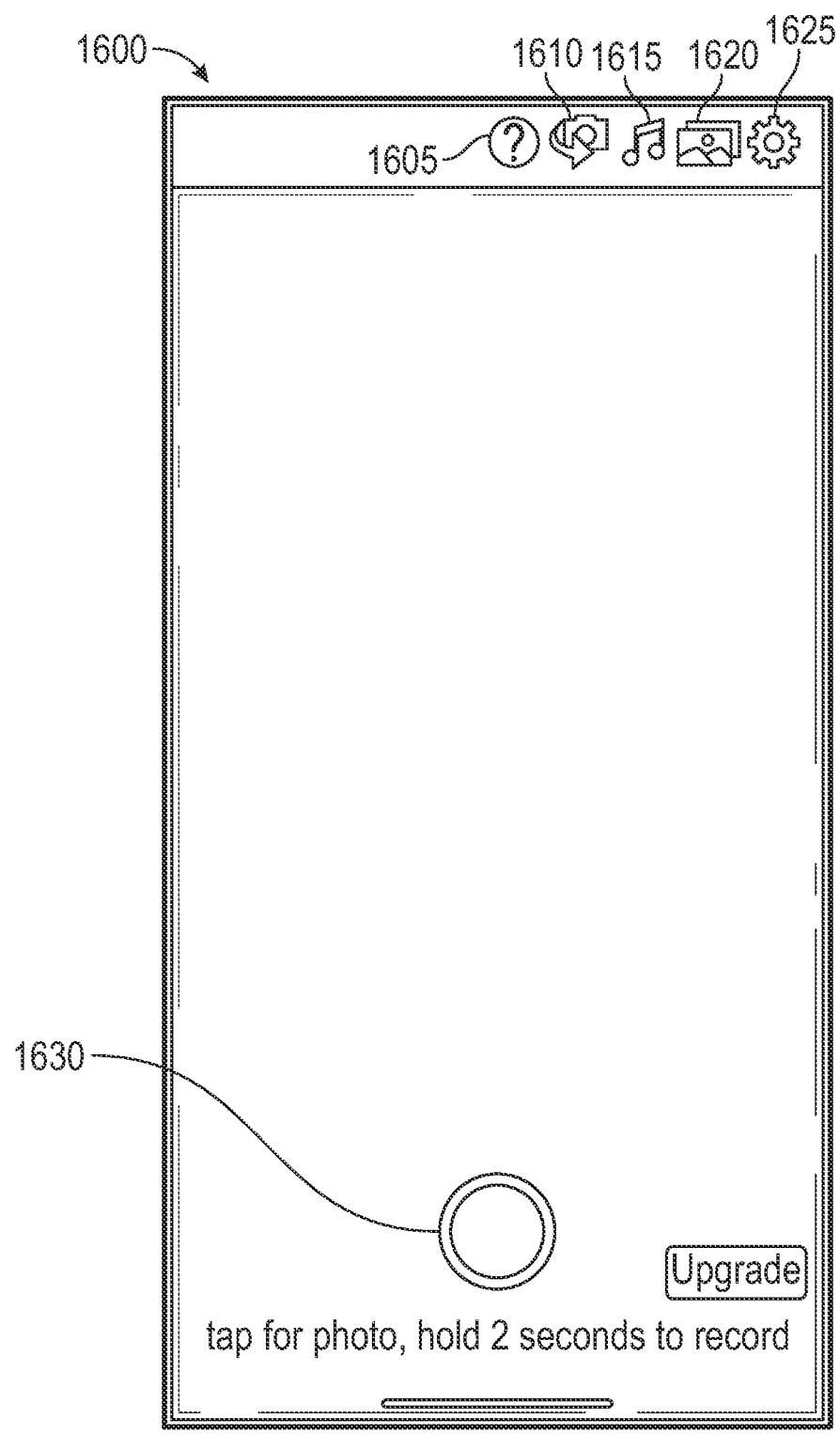
FIG. 16 depicts a screen shot of an interface on a user device, for augmented reality play, in accordance with the disclosed embodiments.

FIG. 16 illustrates an embodiment of an interface 1600 of display 605 with touch sensitive buttons. The touch sensitive buttons can include a help button 1605 which accesses tutorial and troubleshooting information; a camera flip button 1610 that allows the user to toggle between a front facing and rear facing camera; a sound button 1615, that allows the user to select background audio, music, or other sound effects to be played during augmented reality rendering; a background button 1620 that allows the user to access various backgrounds in the augmented background library and objects in the augmented objects library; a mode selection button 1625 allows the user to select between a green screen mode or a non-green screen "magic mode" where a chroma key background is not required; and a record button 1630 to allow the user to being recording the augmented reality rendering.

As the user interacts with objects in the play space as shown at step 1520, the augmented reality system can modify the rendering of those objects and the background on the display, as shown at 1525. The system can use gesture recognition, as illustrated at step 1530, as input to modify the augmented reality the user is experiencing. The system can further optionally record the rendering of the augmented reality at the user's instruction as illustrated at step 1535. The method ends at 1540.

Figure 17:
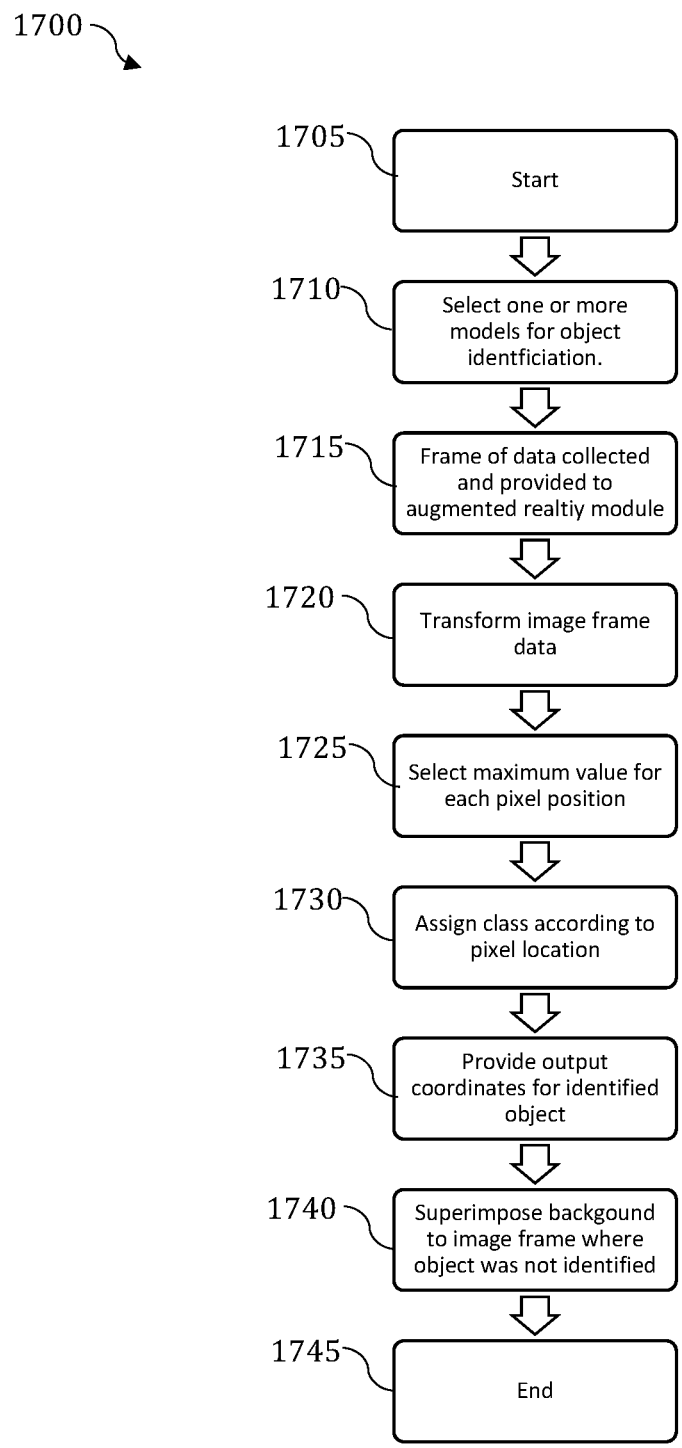
FIG. 17 depicts an steps in a method associated with rendering an augmented reality, in accordance with the disclosed embodiments.

FIG. 17, illustrates a flow chart associated with a method 1700 for augmented reality rendering. It should be appreciated that the order and frequency of the steps in method 1700 are exemplary, and in other embodiments, the order of steps can differ and one or more of the steps can be repeated one or more times. In other embodiments, certain steps can be performed concurrently as necessary to realize the desired augmented reality rendering. The method begins at 1705.

First, an object recognition model needs to be trained, or pre-trained models can be loaded into the object recognition model as illustrated at 1710. In certain embodiments, the model is a semantic segmentation model although in other embodiments other models could be used. Next at step 1715, a frame of image data can be provided from the camera to the augmented reality module.

The augmented reality module can then perform a transformation on the input image frame as shown at 1720, converting it to a type Float16 to mask(image) Float16 with N channels, where each channel corresponds to a class, such as, "background," "person," "toy," etc. The maximum value for each pixel position across the channels can be selected at step 1725. The augmented reality module can then assign a class to the pixel depending on where the maximum pixel was taken from (e.g. channels 1, 2, or 3) at step 1730.

The output is provided at step 1735. The output can comprise a set of coordinates defining an identified object in the image. With the object location and type identified, the augmented reality module can then superimpose a desired background (e.g. a background selected from the augmented background library) over every pixel in the image that was not identified as the object, as shown at step 1740. The method ends at 1745.

It should be understood that this method provides the desired background, in a single collected frame. A similar concurrent method can be completed to superimpose augmented reality foregrounds over the object, which can include clothes, effects, other objects, etc. Furthermore, in order to generate a real-time or near real-time video rendering on the display, some or all of the aforementioned step can be repeated sequentially for every frame of video collected by the camera, such that the display provides an augmented reality video display on the display screen.

It should further be appreciated that, in order to maximize efficiency, in certain embodiments, the method can further include a check to verify each frame has been properly processed. If the frame was properly processed in real-time, the frame can be added to the video sequence for display. However, if the frame was not properly processed in real-time, the frame can be discarded from the sequence of frames used to render the real-time or near real-time augmented reality, viewable by the user on the display. This improves performance in the real-time augmented reality rendering.

Further, if the user elects to capture and record the augmented reality rendering they are creating, the system can collect all the frames that were not properly processed in real-time, correct the error in those frames, and then reinsert the frame into the sequence of frames in the saved recording. In this way, the quality of the saved recording of the augmented reality rendering is improved, while the performance of the real time rendering is maintained.

It should be appreciated that in various embodiments, the system can work in a regular mode (with a chroma key background) or in a "magic mode" (without a chroma key background). In any such embodiment, the augmented reality experience can include the use of cubes 435 rendered as animated figures. A user can select foreground features to be rendered as well. While the experience of playing is augmented by the augmented reality it remains tactile because the user manipulates the cubes 435 and/or figures in the real world. The user can thus have a virtual background, virtual foreground, and a virtually rendered toy which they can touch, feel, and control with their hands in the real world.

Based on the foregoing, it can be appreciated that a number of embodiments, preferred and alternative, are disclosed herein. For example, in one embodiment, a system comprises a user device, the user device comprising, a camera, and a computer system, the computer system further comprising: at least one processor, a graphical user interface, and a computer-usable medium embodying computer program code, the computer-usable medium capable of communicating with the at least one processor, the computer program code comprising instructions executable by the at least one processor and configured for: collecting at least one frame of video with an image capture module; identifying at least one user controlled object in the at least one frame of video with an object recognition module; and rendering an augmented reality display on the user device with an augmented reality module, the augmented reality display including an augmented background and a rendering of the at least one user controlled object. In an embodiment, the at least one user controlled object comprises a toy.

In an embodiment, the at least one user controlled object comprises a plurality of user controlled objects, the plurality of user controlled objects further comprising a doll and a first block. In an embodiment, the system further comprises an ID suit configured to fit on the doll, the ID suit further comprising at least one ID suit dot. In an embodiment, the block comprises a cube and at least one ID dot configured on the cube.

In an embodiment, the system further comprises an augmented object library configured to store a plurality of selectable augmented objects, wherein an augmented object is selected from the plurality of selectable augmented objects. In an embodiment, the system further comprises rendering the augmented object in the augmented reality display at a location of the first block.

In an embodiment, the system further comprises an augmented background library configured to store a plurality of selectable augmented backgrounds, wherein the augmented background is selected from the plurality of selectable augmented backgrounds.

In an embodiment, the system further comprises an augmented effects library configured to store a plurality of selectable augmented effects, wherein an augmented effect is selected from the plurality of selectable augmented effects. In an embodiment, the system further comprises rendering the augmented effect in the augmented reality display. In an embodiment, the system further comprises identifying a user gesture in the at least one frame of video with a gesture recognition module and rendering an augmented effect in the augmented reality display associated with the user gesture.

In an embodiment, an augmented reality play system comprises a screen stand, a user device stand for holding a user device, a doll, a first block, and a user device, the user device comprising, a camera, and a computer system, the computer system further comprising: at least one processor, a graphical user interface, and a computer-usable medium embodying computer program code, the computer-usable medium capable of communicating with the at least one processor, the computer program code comprising instructions executable by the at least one processor and configured for: collecting at least one frame of video with an image capture module; identifying the doll in the at least one frame of video with an object recognition module; identifying the first block in the at least one frame of video with the object recognition module; identifying the second block in the at least one frame of video with the object recognition module; and rendering an augmented reality display on the user device with an augmented reality module, the augmented reality display comprising: an augmented background, a rendering of the doll, and a rendering of the first block as a first augmented object. In embodiment, the augmented reality play system further comprises a green screen configured to fit over the screen stand.

In an embodiment, the augmented reality play system further comprises an augmented object library configured to store a plurality of selectable augmented objects, wherein the first augmented object is selected from the plurality of selectable augmented objects. In an embodiment, the augmented reality play system further comprises an augmented background library configured to store a plurality of selectable augmented backgrounds, wherein the augmented background is selected from the plurality of selectable augmented backgrounds. In an embodiment, the augmented reality play system further comprises an augmented effects library configured to store a plurality of selectable augmented effects, wherein an augmented effect is selected from the plurality of selectable augmented effects and render in the augmented reality display.

In another embodiment, a system comprises a user device, the user device comprising, a camera, and a computer system, the computer system further comprising: at least one processor; a graphical user interface; and a computer-usable medium embodying computer program code, the computer-usable medium capable of communicating with the at least one processor, the computer program code comprising instructions executable by the at least one processor and configured for: collecting at least one frame of video with an image capture module, identifying at least one user controlled object in the at least one frame of video with an object recognition module, identifying an augmented background for rendering, identifying a context of the augmented background with a context recognition module, and rendering an augmented reality display on the user device with an augmented reality module, the augmented reality display including the augmented background and a rendering of the at least one user controlled object.

In an embodiment, the system further comprises rendering the at least one user controlled object as a contextually appropriate augmented object in the augmented reality display at a location of the at least one user controlled object. In an embodiment, the system further comprises an augmented effects library configured to store a plurality of selectable augmented effects, wherein an augmented effect is selected from the plurality of selectable augmented effects. In an embodiment, the system further comprises rendering a contextually appropriate augmented effect in the augmented reality display, selected from the plurality of selectable augmented effects in the augmented effects library.

It should be appreciated that variations of the above-disclosed and other features and functions, or alternatives thereof, may be desirably combined into many other different systems or applications. It should be understood that various presently unforeseen or unanticipated alternatives, modifications, variations or improvements therein may be subsequently made by those skilled in the art which are also intended to be encompassed by the following claims.

What is claimed is:

1. A system comprising:
a user device, the user device comprising, a camera, and a computer system, the computer system further comprising:
at least one processor;
a graphical user interface; and
a non-transitory computer-usable medium embodying computer program code, the non-transitory computer-usable medium capable of communicating with the at least one processor, the computer program code comprising instructions executable by the at least one processor and configured for:
collecting at least one frame of video with an image capture module;
identifying at least one user controlled object in the at least one frame of video with an object recognition module, wherein the object recognition module can analyze geometric information associated with the at least one user controlled object in order to identify one or more augmented modifications that can be rendered based on the at least one user controlled object;
rendering an augmented reality display on the user device with an augmented reality module, the augmented reality display including:
an augmented background selected from an augmented background library accessible with a background button, the augmented background comprising a digital photo or digital video stored electronically rendered on the user device;
a rendering of the at least one user controlled object comprising a first block, as an augmented object selected from a digital library of object files of items organized by category, wherein the user controlled object is rendered on the user device as the augmented object after the augmented object is selected by a user;
rendering a plurality of foreground filters configured to be moved around the augmented reality display by the user; and
a rendering of an augmented effect comprising at least one of an animation or a sound effect, contextually related to the augmented background; and
recording the rendered augmented reality display.

2. The system of claim 1 wherein the at least one user controlled object comprises a toy.

3. The system of claim 1 wherein the at least one user controlled object comprises a plurality of user controlled objects, the plurality of user controlled objects further comprising:
a doll; and
the first block.

4. The system of claim 3 further comprising:
an ID suit configured to fit on the doll, the ID suit further comprising a plurality of ID suit dots, wherein the ID suit is a chroma key color, and wherein the augmented reality module renders selected clothing on the doll in place of the ID suit, on the user device.

5. The system of claim 3 wherein the first block further comprises:
a cube; and
four dots configured on each of six faces of the cube.

6. The system of claim 3 wherein the digital library further comprises:
an augmented object library configured to store a plurality of selectable augmented objects, wherein the augmented object is selected from the plurality of selectable augmented objects.

7. The system of claim 1 further comprising:
a context recognition module comprising a machine learning module trained as a classifier to identify background characteristics in the augmented background and pair the identified background characteristics in the augmented background with appropriate augmented effects.

8. The system of claim 1 wherein the augmented background library is configured to store a plurality of selectable augmented backgrounds, wherein the augmented background is selected from the plurality of selectable augmented backgrounds.

9. The system of claim 1 further comprising:
an augmented effects library configured to store a plurality of selectable augmented effects, wherein the augmented effect is selected from the plurality of selectable augmented effects.

10. The system of claim 1 wherein the first block comprises a chroma key cube.

11. The system of claim 1 further comprising:
identifying a user gesture in the at least one frame of video with a gesture recognition module; and
rendering the augmented effect in the augmented reality display associated with the user gesture.

12. An augmented reality play system comprising:
a screen stand;
a user device stand for holding a user device;
a pair of chroma key gloves configured to obfuscate the user's hands;
a doll;
a first block; and
the user device comprising, a camera, and a computer system, the computer system further comprising:
at least one processor;
a graphical user interface; and
a non-transitory computer-usable medium embodying computer program code, the non-transitory computer-usable medium capable of communicating with the at least one processor, the computer program code comprising instructions executable by the at least one processor and configured for:
collecting at least one frame of video with an image capture module;
identifying the doll and the first block in the at least one frame of video with an object recognition module wherein the object recognition module can analyze geometric information associated with the first block in order to identify one of more augmented modifications that can be rendered based on the first block;
identifying a user gesture in the at least one frame of video with a gesture recognition module;
rendering an augmented reality display on the user device with an augmented reality module, the augmented reality display comprising:
an augmented background selected from an augmented background library accessible with a background button, the augmented background comprising a digital photo or digital_video rendered on the user device;
a rendering of the doll;
a rendering of the first block as a first augmented object selected from an augmented object library comprising a digital library of object files of items, wherein the augmented object is rendered on the user device as the augmented object after the augmented object is selected from by a user;
rendering a plurality of foreground filters configured to be moved around the augmented reality display by the user; and
rendering an augmented effect in the augmented reality display associated with the user gesture wherein the augmented effect comprises at least one of an animation or a sound effect determined by a context recognition module comprising a machine learning module trained as a classifier to identify background characteristics in the augmented background and pair the identified background characteristics in the augmented background with appropriate augmented effects
recording the rendered augmented reality display.

13. The augmented reality play system of claim 12 further comprising:
a green screen configured to fit over the screen stand.

14. The augmented reality play system of claim 13 further comprising:
a figurine stand configured to match the color of the green screen.

15. The augmented reality play system of claim 14 wherein the augmented background library is configured to store a plurality of selectable augmented backgrounds.

16. The augmented reality play system of claim 15 further comprising:
an augmented effects library configured to store a plurality of selectable augmented effects, wherein the augmented effect is selected from the plurality of selectable augmented effects and rendered in the augmented reality display.

17. A system comprising:
a user device, the user device comprising, a camera, and a computer system, the computer system further comprising:
at least one processor;
a graphical user interface; and
a non-transitory computer-usable medium embodying computer program code, the non-transitory computer-usable medium capable of communicating with the at least one processor, the computer program code comprising instructions executable by the at least one processor and configured for:
collecting at least one frame of video with an image capture module;
identifying at least one user controlled object in the at least one frame of video with an object recognition module wherein the object recognition module can analyze geometric information associated with the at least one user controlled object in order to identify one of more augmented modifications that can be rendered based on the at least one user controlled object;
identifying and selecting an augmented background from an augmented background library for rendering using a background button;
identifying a context of the augmented background with a context recognition module;

rendering an augmented reality display on the user device with an augmented reality module, the augmented reality display including:
    the augmented background rendered on the user device;
    a rendering of the at least one user controlled object as an augmented object on the user device after the augmented object is selected by a user from a digital library of object files of items;
    rendering a plurality of foreground filters configured to be moved around the augmented reality display by the user; and
    rendering at least one contextually appropriate augmented effect related to the augmented background, the contextually appropriate augmented effect comprising one of an animation and a sound effect; and
recording the rendered augmented reality display.

18. The system of claim 17 wherein the at least one user controlled object comprises:
    a cube; and
    four dots configured on each of six faces of the cube.

19. The system of claim 18 further comprising:

an augmented effects library configured to store a plurality of selectable augmented effects, wherein an augmented effect is selected from the plurality of selectable augmented effects.

20. The system of claim 19 further comprising:

a context recognition module comprising a machine learning module trained as a classifier to identify background characteristics in the augmented background and pair the identified background characteristics in the augmented background with appropriate augmented effects; and a help button configured to access tutorial and troubleshooting information;

a sound button to select background audio and music; and a record button to record the rendering on the augmented reality display.

* * * * *